US008614667B2

(12) United States Patent
McAlindon

(10) Patent No.: US 8,614,667 B2
(45) Date of Patent: Dec. 24, 2013

(54) APPARATUS AND METHOD FOR GENERATING DATA SIGNALS

(75) Inventor: Peter J. McAlindon, Orlando, FL (US)

(73) Assignee: Blue Orb, Inc., Maitland, FL (US)

( * ) Notice: Subject to any disclaimer, the term of this patent is extended or adjusted under 35 U.S.C. 154(b) by 1068 days.

(21) Appl. No.: 11/426,861

(22) Filed: Jun. 27, 2006

(65) Prior Publication Data

US 2006/0291937 A1 Dec. 28, 2006

Related U.S. Application Data

(62) Division of application No. 10/609,168, filed on Jun. 27, 2003, now Pat. No. 7,151,525.

(51) Int. Cl.
*G09G 5/00* (2006.01)
*G09G 5/08* (2006.01)
*G06F 3/033* (2006.01)
*G05G 9/047* (2006.01)
*G06F 1/16* (2006.01)
*G06F 17/00* (2006.01)

(52) U.S. Cl.
USPC ........... 345/157; 345/156; 345/161; 345/184; 74/471 XY; 361/679.08; 361/679.09; 361/679.1; 361/679.18; 463/36; 463/37; 463/38

(58) Field of Classification Search
USPC .............. 345/161, 184, 156–157; 463/36–38; 74/471 XY; 200/6 R, 6 A; 361/679.08–679.1, 679.18
See application file for complete search history.

(56) References Cited

U.S. PATENT DOCUMENTS 4,639,668 A * 1/1987 Petit et al. ................ 324/207.26
5,231,380 A 7/1993 Logan
(Continued)

OTHER PUBLICATIONS

Florian, Jentsch, Peter J. McAlindon, Using Sequential Data analyses to determine the Optimum Layout for an Alternative Keyboard.

(Continued)

*Primary Examiner* — Kenneth Bukowski
(74) *Attorney, Agent, or Firm* — Terry M. Sanks, Esq.; Beusse Wolter Sanks Mora & Maire, P.A.

(57) ABSTRACT

An ergonomic apparatus for generating data signals that may be indicative of alphanumeric characters for use with an electronic device or system such as a computer or electric typewriter, for example. The apparatus may be configured in accordance with ergonomic principles and use one or two hands to generate the data signals. The apparatus may include a set of domes that are shaped and contoured to conform to the shape of hands in a relaxed state and to distribute pressures across the splayed underside of the user's hand. Each dome may be capable of movement in a plurality of directions extending radially from a home position to generate the data signal or a portion of the data signal. The two-handed implementation disclosed utilizes input movements that enable keystroke actuation via only slight arm or hand movement, no finger movement being required. A keyboard layout may be used with the domes to associate movement of each dome with an alphanumeric layout of characters on a conventional keyboard such as a QWERTY keyboard layout. Dome movement may also be associated with the relative location of alphanumeric characters on an associated keyboard and the respective relative frequency of use of an alphanumeric character to be produced. Hand-held embodiments of the apparatus are provided that may be used with portable or other similar electronic devices.

16 Claims, 13 Drawing Sheets

(56) References Cited

U.S. PATENT DOCUMENTS

| | | | |
|---|---|---|---|
| 5,383,735 A * | 1/1995 | Smiley | 400/479 |
| 5,408,621 A | 4/1995 | Ben-Arie | |
| 5,473,325 A | 12/1995 | McAlindon | |
| 5,543,818 A * | 8/1996 | Scott | 345/168 |
| 5,598,527 A | 1/1997 | Debrus et al. | |
| 5,619,021 A * | 4/1997 | Yamamoto et al. | 200/6 A |
| 5,621,196 A | 4/1997 | Nishijima et al. | |
| 5,638,062 A | 6/1997 | McAlindon | |
| 5,751,274 A * | 5/1998 | Davis | 345/157 |
| 5,804,781 A | 9/1998 | Okabe | |
| 5,815,139 A | 9/1998 | Yoshikawa et al. | |
| 5,836,705 A | 11/1998 | Choate | |
| 5,900,829 A | 5/1999 | Gardner et al. | |
| 5,984,548 A | 11/1999 | Willner et al. | |
| 6,037,942 A | 3/2000 | Millington | |
| 6,198,472 B1 | 3/2001 | Lection et al. | |
| 6,256,029 B1 | 7/2001 | Millington | |
| 6,262,355 B1 | 7/2001 | Koch | |
| 6,288,709 B1 | 9/2001 | Willner et al. | |
| 6,292,857 B1 | 9/2001 | Sidoroff et al. | |
| 6,297,806 B1 | 10/2001 | Skog | |
| 6,323,846 B1 | 11/2001 | Westerman et al. | |
| 6,348,878 B1 | 2/2002 | Tsubai | |
| 6,359,243 B1 | 3/2002 | Nakade et al. | |
| 6,369,801 B2 | 4/2002 | Boireau et al. | |
| 6,520,699 B2 | 2/2003 | Abe | |
| 6,552,282 B2 | 4/2003 | Lewis | |
| 6,567,072 B2 | 5/2003 | Watanabe | |
| 6,611,255 B2 | 8/2003 | Griffin et al. | |
| 6,686,906 B2 | 2/2004 | Salminen et al. | |
| 6,756,968 B2 | 6/2004 | McAlindon | |
| 6,897,849 B2 | 5/2005 | Kim | |
| 2002/0080115 A1 * | 6/2002 | Onodera et al. | 345/161 |
| 2003/0058219 A1 * | 3/2003 | Shaw | 345/161 |

OTHER PUBLICATIONS

Questions and Answers from www.keybowl.com/engineering.htm website regarding orbiTouch keyboard, Feb. 7, 2002, pp. 1-7.

I.H. Hymes and J.F. Keeley, Speed Keyboard for Data Processor, IbM Technical Disclosure Bulletin, vol. 23, No. 2, Jul. 1980, pp. 838-839.

* cited by examiner

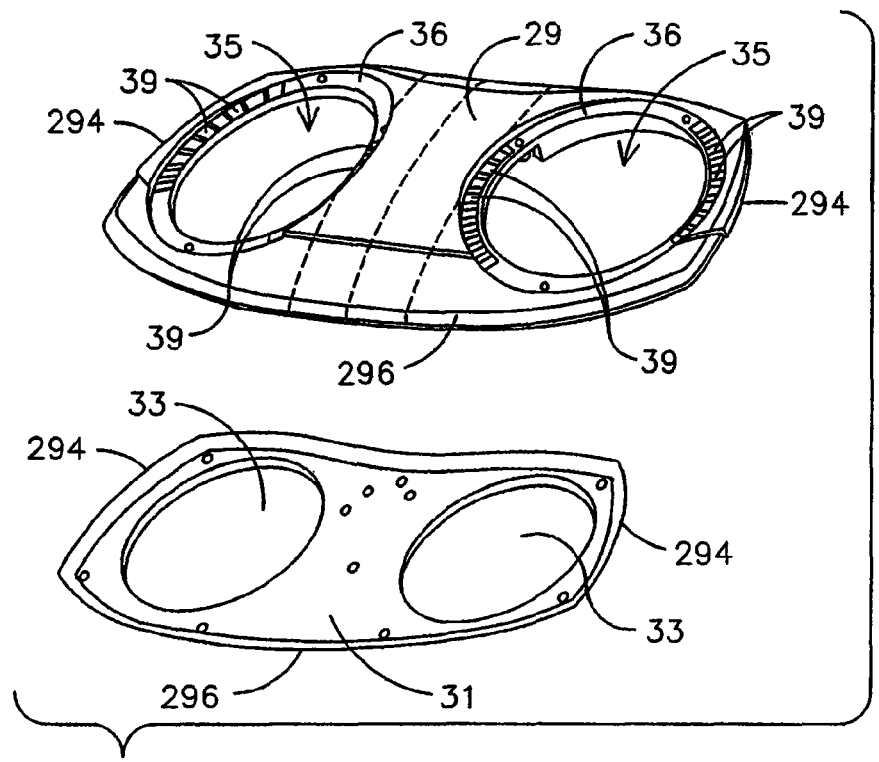
FIG. 2A
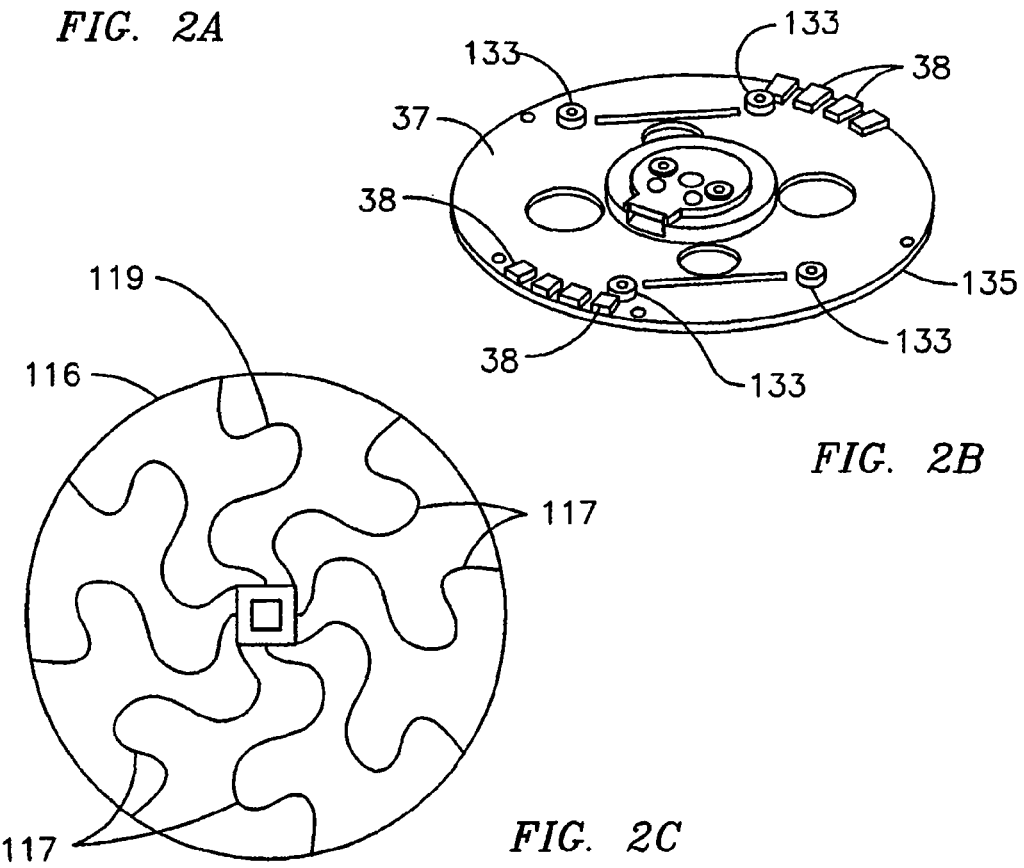
FIG. 2B
FIG. 2C

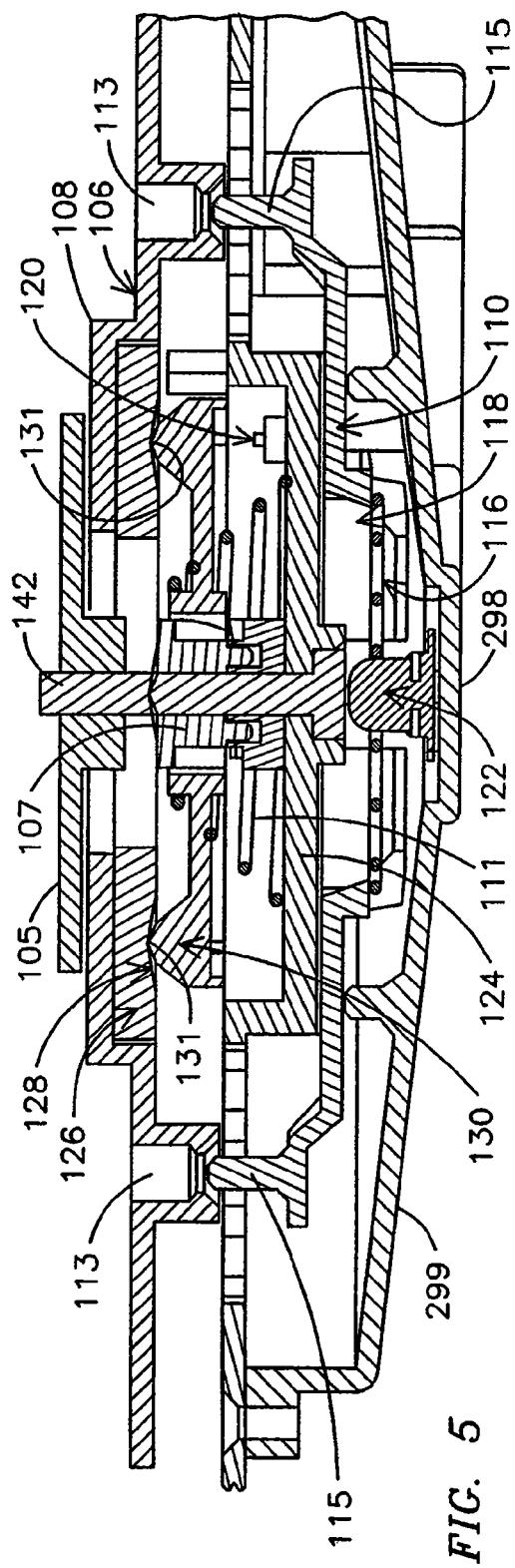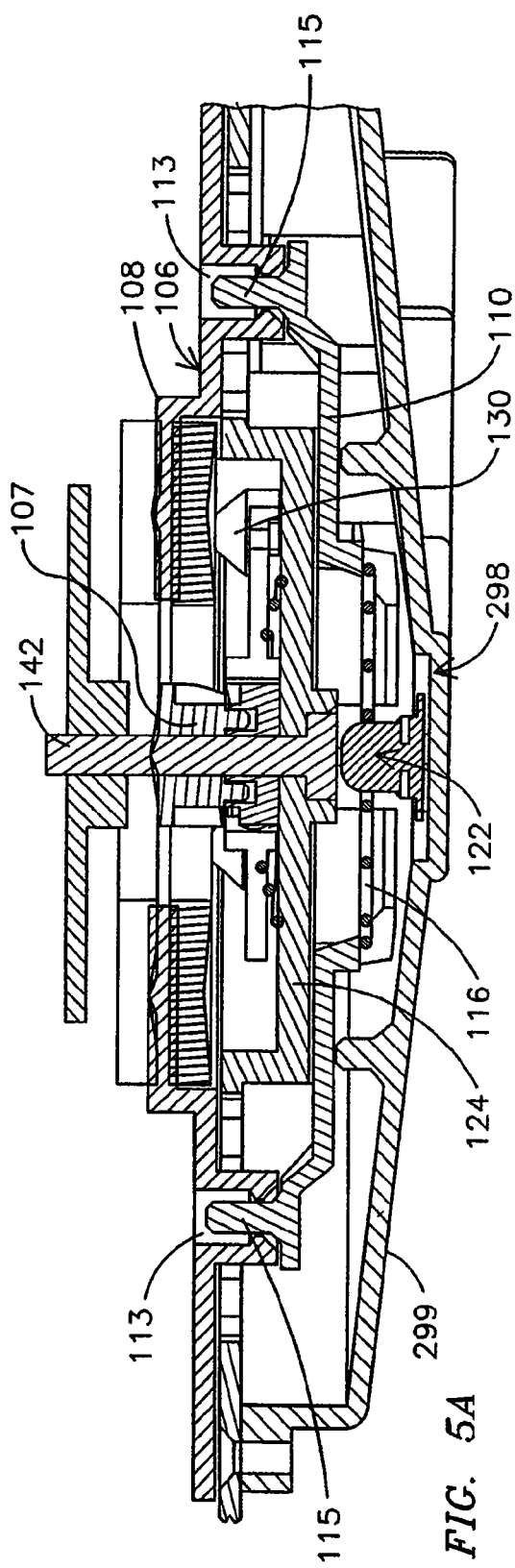

APPARATUS AND METHOD FOR GENERATING DATA SIGNALS

This application is a division of U.S. continuation-in-part application Ser. No. 10/609,168, filed Jun. 27, 2003 now U.S. Pat. No. 7,151,525, which claims the benefit of U.S. application Ser. No. 09/993,260 filed Nov. 14, 2001, which claims the benefit of U.S. provisional application No. 60/248,472 filed Nov. 14, 2000 which are incorporated in their entirety herein by reference.

BACKGROUND OF THE INVENTION

The present invention relates to a human-computer interface for data entry, and more particularly, to a device that is ergonomically designed with reference to the architecture and functions of the human hand, wrist, and arm for generating data signals and/or providing data input to a computing device.

The development of ergonomically designed keyboards has resulted from an increased awareness and identification of physical problems associated with the use of conventional typewriter-like keyboards. An ergonomically designed keyboard attempts to create a key layout that reduces finger travel and fatigue; promotes a more natural hand, wrist, and arm typing posture through design and support structures; or employs various key activation schema in order to enhance typing performance.

Due to the proliferation and availability of computer systems, there has been a dynamic growth in the use of keyboard devices. The term "computer systems" is used generically to refer to any microprocessor based device having a hand or finger operated data entry system, including, for example, PC's, McIntosh, Palm Pilots®, Sony Play Station, Nintendo Game Boys® or Game Stations, Microsoft Xbox or other video game stations. Various annoying and debilitating muscular syndromes have accompanied this expansion, resulting from the repetitive and fatiguing hand, wrist, and finger motions that are required in the use of conventional typewriter like keyboards. There has been a growing concern over neuromuscular injuries among clerical workers, journalists, computer programmers, and others who use computers or typewriters extensively. These injuries, one widely publicized of which is carpal tunnel syndrome, translate not only into pain and potential disability for the affected users, but also into significant loss of money, time, and productivity for businesses. Attention to these problems is not new in the art, as is evidenced by many serious attempts to alleviate keyboard-use "injuries" through innovative keyboard layouts and architectural designs.

Force, repetition, posture, rest, and stress are major factors to be considered in controlling and eliminating keyboard-related injuries (KRIs). Analysis of each factor, both independently and in relation to one another, is necessary in designing a keyboard that eliminates or reduces KRIs, force and repetition being perhaps the most important in the development of an ergonomically designed keyboard. Force is related to the musculature and conformation of the fingers and hands, which place limitations on their ability to perform a given task. Individuals suffering from various musculoskeletal disabilities frequently have special needs in order to perform routine tasks such as using a standard keyboard for entering data into a personal computer.

An abundance of human-computer interaction literature has suggested that some of the recently developed alphanumeric input devices may be more efficient, easier to learn, and may cause less physical trauma than conventional typewriter like keyboards. Of these recently designed keyboards, most incorporate one or more design features that enhance typing performance and reduce or eliminate fatigue or injury. These design features include: (1) splitting the keyboard to minimize wrist deviations; (2) key contouring and flexible key mapping to minimize finger travel; (3) built-in hand and arm support; (4) a ternary capability in which keys rock back and forth to type; (5) a capability to rotate and tilt the device into numerous positions; and (6) a chordal capability, in which more than one key must be depressed for a single character to be output.

In reference to eliminating or reducing force and repetition fatigue factors, three approaches are illustrated in U.S. Pat. No. 4,332,493, issued to Einbinder, U.S. Pat. No. 4,849,732, issued to Dolenc, and U.S. Pat. No. 5,178,477, issued to Gambaro. Einbinder discloses a typewriter keyboard in which the keys are arranged to conform to the "footprint" of the human hand. This layout of keys is designed with topographically height- and angle-differentiated actuation pads that attempt to minimize overall hand and finger motion. The Einbinder device stresses the importance of having "home positions" for the finger and thumb tips, from which position the fingers, and therefore the hands, must travel appreciably in order to perform typical typing operations. Thus, the Einbinder device eliminates only a portion of the problem in solving the motion difficulties encountered with conventional keyboards.

Similarly motivated by safety-related concerns, Dolenc teaches a one-hand key layout that includes a fanlike array of plural keys distributed in elongated rows and organized for specific actuation by the thumb and four fingers of the hand. Dolenc's device is concerned with minimizing hand motion, but not finger motion. In fact, Dolenc speaks in terms of organizing keys in arrays in such a fashion that they take into account the "motion and range of the respective fingers of the hand." Thus, Dolenc clearly considers fingertip actuation of each key. While Dolenc addresses the issue of minimizing hand motion, the disclosed system does not appreciably contribute to minimizing finger motion, or to related wrist motion. In addition, this device does not address the angular and topographical distinctions for individual keys, such as those described in the Einbinder patent. Dolenc also does not establish a "home position" for the tips of the fingers and thumb, as did Einbinder.

Gambaro discloses an ergonomically designed keyboard that is organized with an array of keys that are disposed generally "to complement the splayed underside architecture of the user's hand." A two-handed implementation is disclosed wherein each array includes, for each finger of the hand, a cluster of input keys that are placed in such a manner that they enable key actuation via only "slight, gestural, relatively closing motion of a portion of a confronting finger, and for the thumb in each hand." In addition, this design tries to overcome ergonomic problems with a set of keys disposed within two adjustable "hand-print"-shaped depressions. No appreciable movement of the fingers from the fingertip down to immediately below the first finger joint is required, each finger being capable of accessing four keys for the middle, ring, and little fingers, eight keys for the first finger, and a multitude of keys for the thumb. Again, even though drastically reduced, finger movement is still required, and all fingers are required for full key set actuation.

Computing and other devices that respond to data signals are regularly used for relatively long periods of time by people of all ages and abilities. Consequently, it is becoming increasingly important that a device accommodate extended periods of usage and take into account the special needs of those who may be physically challenged or otherwise disabled. Prior art devices in general demand considerable manual and digital dexterity to operate, making them relatively difficult for extended usage and a portion of the population to utilize efficiently and effectively.

SUMMARY OF THE INVENTION

Given the growing concern over keyboard-related finger and hand motion problems, one aspect of the present invention provides an ergonomic human-computer interface apparatus that obviates overuse injuries, with the primary focus being on the entire aggregate of hand, wrist, and finger motions. Applicant has previously obtained U.S. Pat. Nos. 5,638,062 and 5,473,325 for ergonomically designed data input devices. Both of these patents disclose a hand or palm operated device that may be used to generate data input signals by the sliding of a dome-shaped member towards different sectors of a circle. For typing or the generation of other alphanumeric characters, two such members may be used, one controlled by each hand, so that two signals may be generated and combined to produce as many keystroke entries as are generated by a conventional typewriter style keyboard.

One exemplary embodiment of an apparatus in accordance with aspects of the present invention may comprise a pair of input devices, one for each hand. The apparatus may comprise a base and two palm engaging supports each in the shape of a dome that fits in close complementary relationship with the palmar architecture of a user's hand in a relaxed state. Thus, the hands and wrists of the user may be maintained in their most relaxed position and in one exemplary embodiment the domes may be tilted downwardly and away from the user's left-right midplane. Each dome may be coupled through movable means to the apparatus base, which may be shaped with a pair of shallow recesses dimensioned to receive a respective dome so that a lower edge of each dome may be positioned above a peripheral edge defining each recess. In one exemplary embodiment each dome may be maintained in a "home" or "centered" attitude when not under stress. When a dome is subjected to a sliding motion, a biasing means such as a coil spring, for example, may exert a force on a means for sensing the location or movement of the dome. This means for sensing may be provided to sense the movement and/or location of the dome for a specified direction of moving from the "home" position. In one exemplary embodiment, the biasing means may be an eight-legged spring that may exert tangential forces to the means for sensing movement and/or location that correlate one-to-one to the motions of each dome. Means for guiding each dome may be provided such as a flower pedal shaped impression as more fully described below.

In one exemplary embodiment, an ergonomic handpiece, or dome, may be coupled to a kinematic map plate that is positioned above and coupled to an actuation armature. The kinematic map plate may include a means for guiding the dome such as a variable depth kinematic impression in the shape of a flower such that the flower-pedal shaped impression has a number of discrete pedals. One exemplary embodiment allows for the kinematic map plate to mate to a four post spider mechanism that may actuate or move vertically along a pair of guide posts on the upper director plate. Respective ones of the four spider posts may mate to the respective centers of the kinematic map plate flower pedal impressions to provide a means for guiding a domes into one of eight cardinal movement zones. When the dome is moved a sufficiently linear distance, it may be moved into one of the flower points defining the end of a flower-pedal impression. Means for registering dome displacement may be provided via the mating of a flower pedal point and a respective spider post, which in turn may generate a location signal. When a location signal is generated by each input device or dome sequentially or simultaneously, the pair of location signals may be translated into a unique "keystroke" signal. It can be appreciated that the possible number of unique keystroke signals available is related to the number of flower pedals in each input device. That is, it is at least equal to the number of flower pedals in the right-hand input device times that in the left-hand input device. This combination of signals to generate a unique keystroke is referred to herein as "chording". Chording may be used to generate a set of user-definable alphanumeric characters or functions, for example, which may then be processed into a form suitable for transmission to a computer or other electronic device, for example.

One exemplary embodiment allows for accessing a set of keystrokes by generating signals indicative of the location or movement of each input device or dome used alone or jointly. A color-coded annulus may be provided for each dome in accordance with aspects of the present invention wherein each annulus may contain indicia that provide a correspondence between dome attitude and keystroke. Each annulus may be affixed to the top edge of the apparatus base wall where each is visible. Another exemplary embodiment allows for generating a data signal indicative of a keystroke by combining movement of one or more domes with switching the apparatus among various operating modes such as a "num lock" mode, a "shift" mode, a "shift-lock" and/or a "caps lock" mode, for example. Using the movement or position of one or both domes in combination with various modes increases the number of keystrokes available for generating alphanumeric or other special characters or functions.

Various embodiments of the invention described herein require no appreciable hand or wrist motion and no finger motion. Instead, the movement required is relatively small such that only a slight motion of a user's arms is required to output a desired keystroke. More specifically, use of various embodiments requires little shifting of the hand from a rest position and does not require wrist rotation for maneuvers that are performed on conventional keyboards by the four fingers and the thumb. Since the fingers are not required to perform any maneuvering for typing, instead of focusing on finger-tip activation, various embodiments of the present apparatus require only slight motion of a person's arm and/or hand for actuation of keystrokes. Also, the left hand and right hand domes, in one exemplary embodiment, may have different switches to activate various keyboard functions. For example, in the left hand dome a switch may be provided at the location of the top surface of the upper director plate. Applying vertical pressure to the dome may activate this switch. When the switch has not been depressed, a first set of unique keystroke signals may be available, as described above. A single depression and release of the dome allows for access to a second set of keystroke signals that may be equal in number to the first set. For example, depressing and holding of the left dome may access the "shift" function or depressing and releasing the left dome may activate the "shift-lock" function.

In another aspect of the present invention, switching means may be provided for selectively altering or controlling the location of a cursor by placing one dome into a "mouse" mode. A single sequential depression and release of the right hand dome, for example, may allow that dome to act as a positioning cursor or "mouse". This vertical actuation may disengage the spider mechanism from the dome to allow the dome freedom of movement for cursor control. In this respect, the spider mechanism may move vertically between one of two positions on vertical actuation by the right hand dome. An engaged position allows the spider member to seat firmly in the flower pedal impressions to aid in dome guidance. A disengaged position may place the spider mechanism in a position so it is not seated in the flower pedals impressions. The disengaged position allows for the kinematic map plate the about freely in 360 degrees for cursor control. To effect this capability, one exemplary embodiment allows for an opposing ramp geometry or camming mechanism to be seated within a center aperture of the spider mechanism. In one exemplary embodiment, as the spider mechanism is depressed via the dome, a plurality of camming protruberances within the aperture may engage the ramps or camming surfaces causing the spider mechanism to disengage from the kinematic map plate and rotate approximately 45 degrees. Depression of the dome may also actuate a switch that enables the mouse mode. The spider mechanism may re-engage the underside of the kinematic map plate after rotation and release of the dome at points that do not contain the flower-pedal impressions. Concave impressions may be formed on the underside of the kinematic map plate for receiving posts of the spider mechanism allowing for the dome's freedom of movement. When the dome is depressed and released again the spider mechanism may rotate and re-engage the flower-pedal impressions and the keyboard mode may be enabled.

In another exemplary embodiment, depression of the dome may lower the spider mechanism without rotation to a position below the kinematic map plate and retain it in that position. In this respect, the camming mechanism may rotate within the aperture formed in the kinematic map plate to activate the mouse mode and retain the spider mechanism below the kinematic map plate via the camming protuberances and surfaces so the dome is in the "free form" position. When the camming mechanism is rotated and the mouse switch is activated the mouse mode is initiated. Once initiated, the electronic logic of a control processing module may sense the mode and allow for mouse cursor movement using the right hand dome. In one exemplary embodiment the left hand dome may then be used for the mouse left, right, and middle clicks and one embodiment allows for up to sixteen different clicks to be programmed in the apparatus. This type of built-in cursor or "mouse" activation and control allows a user to keep their hands on the respective domes continuously for total hand on-board typing and cursor control. In one exemplary embodiment the right switch may be mounted on the top surface of the upper director plate on the right hand dome assembly. Applying vertical pressure to the dome may activate this switch. When the switch has not been depressed, a first set of unique keystroke signals may be available. A single depression and release of the dome allows for access to the mouse navigation signal.

Another exemplary aspect of the present invention allows for palm and finger rests or pads to be provided on one or both of the domes that engage and support the hand during motion of the hand when moving a respective dome rather than being contoured to only fit the shape of a static hand. Various aspects of the present invention allow for maximum flexibility in defining character location, activation force, activation displacement, and physical orientation of the apparatus. For example, it can be used by a physically challenged individual because it will permit adaptation to his or her unique physical requirements. In addition, because finger movement may be totally eliminated, individuals with partial hand or finger paralysis or absence can still manipulate the apparatus. Additional flexibility is provided in that variable dome sizes may be made to accommodate any user. In recognition that a "one-size-fits-all" approach may not be entirely appropriate to deal with users' hands that are significantly larger or smaller than a "median" hand size, various embodiments of the present invention allow for different dome sizes to accommodate a range of hand sizes and finger spans. In addition, it can be appreciated by one skilled in the art that other ergonomically satisfactory shapes besides contoured domes may be utilized, such as balls or flat boards, for example.

Miniaturization of conventional keyboards has been a difficult task because of the need to accommodate human fingers. One exemplary embodiment of the invention described herein allows for easy miniaturization and requires the use of only one finger, such as the thumb, of each hand, to operate the apparatus. For example, an exemplary embodiment of a thumb controlled mechanism disclosed herein can be implemented as a pair of thumb-operated elements on the face of computing devices such as a Palm Pilot® or Game Boy® hand-held units, for example. Further, since various embodiments of the present invention contain no unitary "keys" requiring independent movement, it is possible to make the apparatus completely sealed for weatherproofing so that they are hostile-environment ready. Their design allows for total enclosure and therefore protection from water, dirt, dust, etc.

It can be appreciated that another alternate embodiment of the present invention may comprise a unitary input apparatus as already described for one-handed operation. A certain set of keystrokes may be accessible by rocking the dome into the available signal-generating sectors, the number of keystrokes available being equal to the number of sectors. In addition, chording is possible with the use of the switching means described above. In this exemplary embodiment, the user may rock the dome into one sector while simultaneously depressing the dome sufficiently to activate the switching means. While maintaining vertical pressure on the dome, the dome may be returned to the "home" position and then moved into a second sector. The signals generated by the motion of the dome are then "chorded" in a similar fashion to that utilized in the dual input device embodiments.

BRIEF DESCRIPTION OF THE DRAWINGS

FIG. 2A is a perspective exploded view of an exemplary embodiment of a top half and a bottom half of the keyboard housing of FIGS. 1 and 2;

FIG. 2B is a perspective bottom view of an exemplary upper director plate;

FIG. 2C illustrates a plan view of an exemplary spring in accordance with aspects of the present invention;

FIGS. 5 and 5A illustrate in cross-section details and broken away from a housing an exemplary embodiment of a control assembly in two respective positions in accordance with aspects of the present invention;

DETAILED DESCRIPTION OF THE PREFERRED EMBODIMENT

Figure 1:
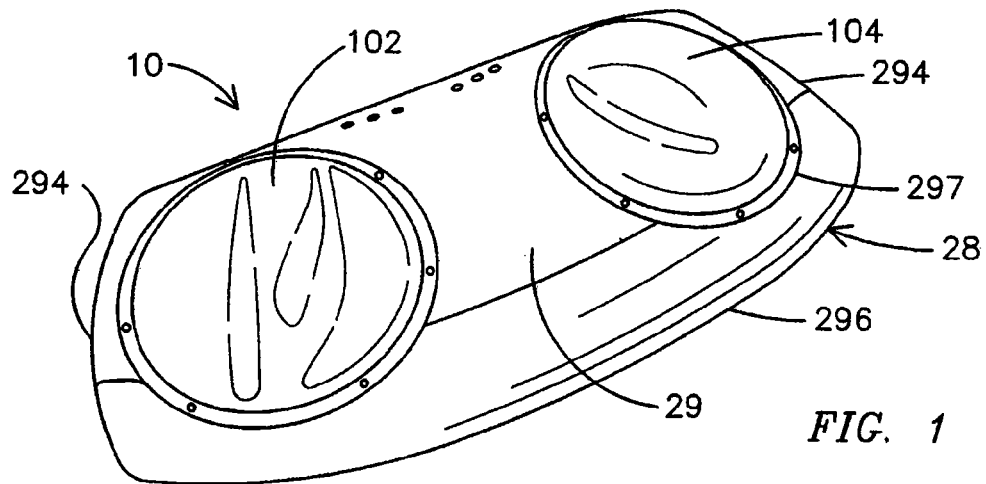
FIG. 1 is a perspective view of a keyboard illustrating one exemplary embodiment of the invention, using two domes shaped to fit the natural shape of the hands at rest.
Figure 2:
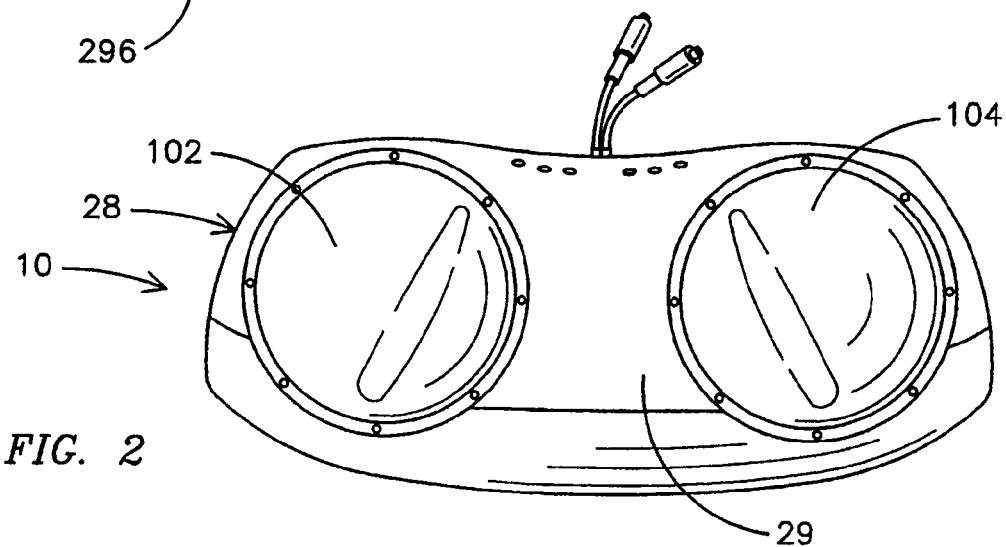
FIG. 2 is a top view of the keyboard of FIG. 1, illustrating the general shape of the keyboard.

Referring to FIGS. 1 and 2, there is indicated generally by the reference numeral 10 an ergonomically designed interface apparatus for entering data or information by a human operator to a suitable electronic system (not shown) such as a computer. The coupling arrangement between apparatus or keyboard 10 and a conventional computer, which entails an electronic device coupled with an electronic alphanumeric device, is well known to those skilled in the art and may be a communication link using a cable, infrared, radio transmitter/receiver or other suitable means.

In accordance with aspects of the present invention, keyboard 10 may take on a sculpted form that is intended to complement closely the typical palmar architecture of the human hand at rest. Accordingly, keyboard 10 may have bilateral symmetry, which can be seen in FIG. 2, with a left-hand device or controller 102, which conforms to a user's left hand, and a right-hand device or controller 104, which conforms to the user's right hand. In one exemplary embodiment, various hand-shaped domes or undulations may be formed in each device 102, 104 to aid in positioning and improving comfort. Devices 102, 104 may be operatively secured to a housing 28 and these structures may be formed of molded plastic.

For simplification, the structure and operation of the interface keyboard 10 is described hereinafter primarily with reference to right-hand input device 104, it being understood that device 102 may be structurally and operatively identical with certain exceptions described herein in accordance with aspects of the present invention. Keyboard 10 may include a housing 28 formed with a top half 29 and a bottom half 31 as more clearly shown in FIG. 2A. Housing 28 may be formed with curved sidewalls 294 and a curved proximate edge 296. The bottom half 31 of housing 28 may include a pair of shallow recesses 33 that are dimensioned to receive a lower portion of a base plate attached beneath respective controllers or domes 102, 104 as more fully described below. The top half 29 of housing 28 may include two openings 35 dimensioned to receive the base plate and allow the underside peripheral edges 37 of an upper director plate 135, shown in FIG. 2B, to rest on respective annular rims 36. One exemplary embodiment allows for the openings 35 to be formed so that annular rims 36 slant downwardly and away from each other with bilateral symmetry toward respective sidewalls 294. In this respect, the peripheral edges of openings 35 closest to the middle of the top half 29 of housing 28 are higher than those peripheral edges closest to the sidewalls 294. This allows for the domes 102, 104 to ergonomically conform to the position of a user's hands and arms when they are substantially at rest on the domes 102, 104.

One aspect of the present invention provides a means for selecting a reference or "resident North" direction for each respective dome 102, 104 so that an end user may select the "resident North" direction for each dome to accommodate that end user's needs or preferences. The "resident North" or reference direction may be the easiest direction for an end user to move a respective dome, for example, when the user's hands are placed on the domes. Each dome 102, 104 may be moved in different directions into its "resident North" position as selected by the end user. The upper director plate 135 may move in response to movement of a respective dome 102, 104 into its respective "resident North" position, which may correspondingly translate an actuation armature, as more fully described below. The means for selecting may include opposing sets of teeth 38 on the underside of upper director plate 135 that may matingly engage respective ones of opposing sets of recesses 39 formed within annular rims 36. In this respect, corresponding ones of the teeth 38 and recesses 39 may be engaged when the respective upper director plates 135 are attached to the top half 29 of housing 28 in a "resident North" position selected by the user. This means for selecting is advantageous in that it provides one degree of freedom for individual users to independently adjust the direction for sliding each dome, when attached to respective upper director plates 135, into a "resident North" position. This degree of freedom accommodates a user's particular hands and arms positions for sliding the respective domes. Alternate means will be recognized by those skilled in the art.

Figure 6:
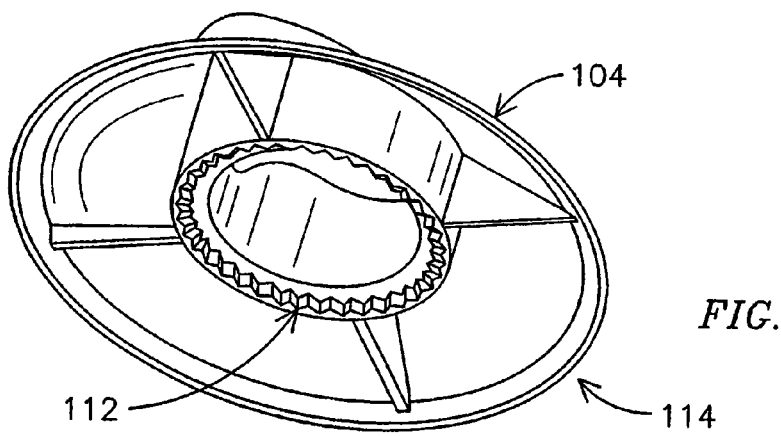
FIG. 6 illustrates an exemplary embodiment of an underside of one dome.

One aspect of the present invention allows for a second degree of freedom with respect to a user's sliding or movement of respective domes 102, 104. Referencing FIGS. 3 and 6, means is provided for adjusting the rotational position of each dome relative to respective kinematic map plates 127 so that an end user may select the position of a dome relative to directions that the dome may be moved. This means for adjusting may include a plurality of gear teeth 112 formed within the underside of respective domes 102, 104 that matingly engage with corresponding gear teeth 125 formed on an upper surface of respective kinematic map plates 127. In this respect, a user may adjust the rotational alignment of each dome with respect to the directions a dome may be moved to generate a data signal. This accommodates that particular user's palmer architecture and/or arm alignment for positioning their hand on a respective dome 102, 104 for sliding that dome into various compass positions, such as the "resident North" position, as more fully described below. This combination of selecting a "resident North" direction and selecting a rotational positioning of respective domes 102, 104 provides an ergonomic benefit to end users.

In an exemplary embodiment suitable for hostile environments, keyboard 10 may be completely sealed and airtight. This may be accomplished by attaching one edge of a rubberized expandable gasket (not shown) around the lower edge of respective domes 102, 104 and the other edge of the gasket to a top surface of housing 28. The gasket may be sufficiently flexible to enable the working of the domes and may be accomplished by using an accordion pleated gasket, for example.

Figure 3A:
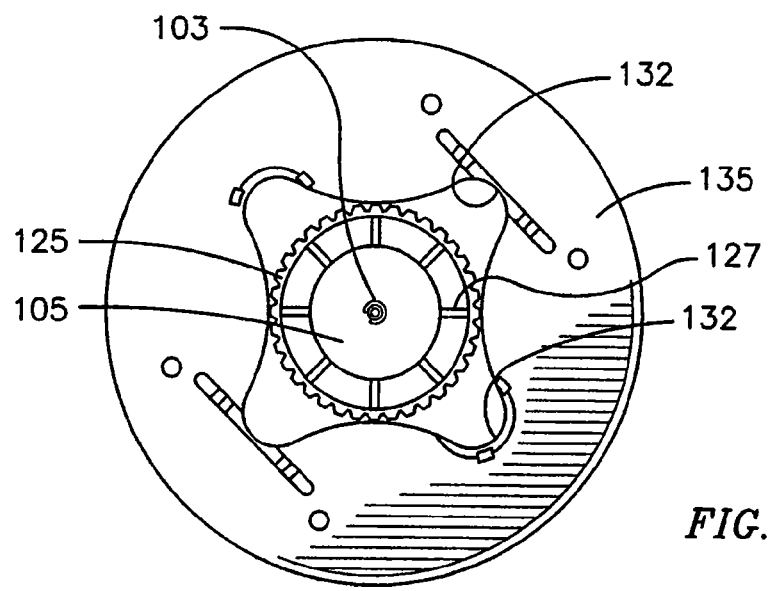
FIG. 3A is a top view of an exemplary embodiment of a kinematic map plate coupled with an upper director plate of the keyboard of FIG. 1.

With reference to FIG. 5 and dome 104 (not shown), one exemplary embodiment allows for dome 104 to be coupled with housing 28 via a ridged annulus 106 that includes a raised upper end 108. It will be recognized that the exemplary embodiment of FIGS. 5 and 5A may form a unitary control assembly that may be removably coupled with the housing 28 so that respective domes 102, 104 may be removed from the housing 28 and used together or independently. The underside of dome 104 may fit over the raised upper end 108 to couple the dome with the annulus. In one exemplary embodiment the raised upper end 108 may include a plurality of circumferentially disposed teeth (not shown) that matingly engage an inside inverse receptacle pattern of teeth 112 (see FIG. 6) on the underside 114 of dome 104. A top cover plate 105 may fit over a shaft or central post 142 and be held in place by a retaining ring 103 (shown in FIG. 3) snapped into a circumferential groove formed in the upper end of the central post 142. As shown in FIG. 5, a biasing means such as a spring 111 may be positioned between the underside of the annulus 106 and an upper surface of an upper director plate 124. This allows for the annulus 106 and consequently an exemplary kinematic map plate 126 and a spider mechanism 130, an exemplary embodiment of which is more clearly shown in FIGS. 3C and 3D, to be depressed and released in response to vertical displacement of the dome 104 when attached to the annulus 106. Spring 111 may function as a means for biasing the spider mechanism 130 against the kinematic map plate 126. In this respect, when the dome 104 is depressed, apertures 113 formed in annulus 106 may receive therein corresponding posts 115 of an exemplary embodiment of an actuator armature 110 as shown in FIG. 5A. As dome 104 is depressed, a spider mechanism 130 may rotate so that the respective posts 131 of spider mechanism 130 disengage from a plurality of impressions 128 formed in the underside of the kinematic map plate 126. Means for allowing dome 104 to move freely within 360° may be provided. This means may cause the spider mechanism 130 to disengage from the impressions 128 and in one exemplary embodiment may include a ramp or gear arrangement 107 fit over the central post 142. In this respect, depressing and releasing dome 104 once may cause the spider mechanism 130 to rotate approximately 45° so that when the dome 104 is released the posts 131 may impinged the underside of the kinematic map plate 126 at locations so they are not engaged within the impressions 128. Depressing and releasing dome 104 again may cause the spider mechanism to rotate approximately 45° so that the tips of posts 131 re-engage respective impressions 128 on the underside of the kinematic map plate 126 for guiding movement of the dome. As the dome 104 is depressed and released the spider mechanism 130 may impinge on switch button 120 to switch the functioning of that dome between a "mouse" mode and a "keyboard" mode as more fully described below.

Figure 3:
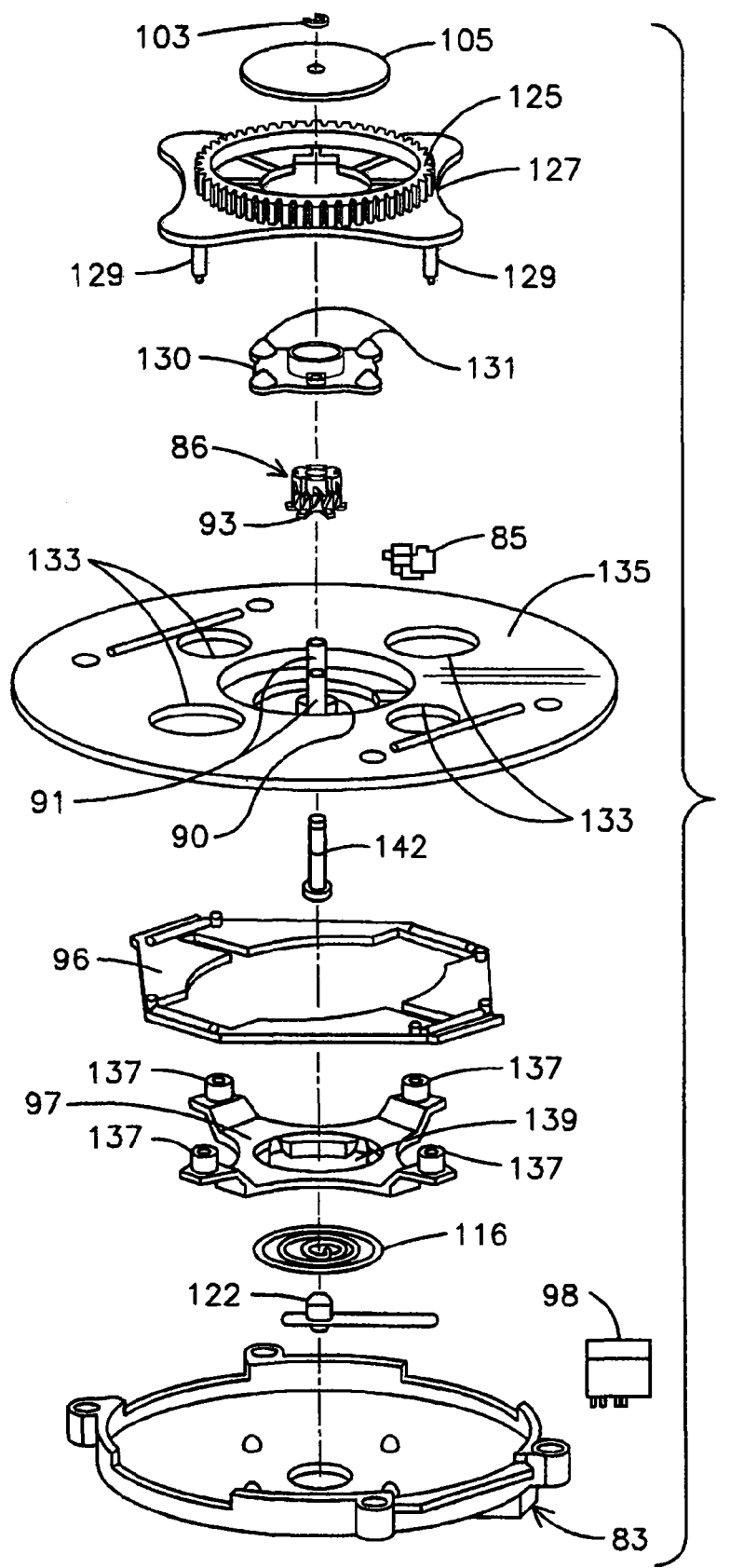
FIG. 3 is an exploded view of a portion of the keyboard of FIG. 1 illustrating an exemplary arrangement of components forming the underlying structure.

A tension parameter associated with the sliding motion of the dome 104 may be modified in the actuator armature 110 with the use of a biasing means such as a spring 116 as shown in FIGS. 5 and 5A. Spring 116 may be snapped or fitted into a hole 118 formed centrally within the base of the armature 110 as more clearly shown in another exemplary embodiment of the present invention shown in FIG. 3. The spring 116 may include a centrally located recess or receptacle that fits over and retains the spring 116 on a position sensing means 122. In this respect, as the actuator armature 110 moves in response to the movement of the dome 104, the spring 116 will exert pressure on the position sensing means 122. It will be appreciated that the installation of a heavier biasing means or spring may increase the tension associated with moving actuator armature 110 and consequently with the sliding of dome 104. In this respect, increasing or decreasing the tension in spring 116 will not lead to a change in force required to activate the position sensing means 122. One exemplary embodiment allows for the spring 116 to be a coil spring as shown in FIG. 3. Another exemplary embodiment allows for the spring 116 to be formed as multi-legged spring that may be molded in whole or in part from the commercially available plastic Derlin, or a composite of Derlin, polytetrafluoroethylene ("PTFE"), tetrafluoroethylene ("Teflon") and/or other suitable alloys or polymers. FIG. 2C shows an exemplary spring 116 having eight curvilinear legs 117 symmetrically disposed in a wheel-spoke fashion. This eight-legged spring may exert tangential and compression forces to the position sensing means 122 that correlate one-to-one to the eight motions of a dome guided by the flower pedal arrangement or impressions 128. In this respect, respective groups of three legs 117 may operate on the position sensing means 122 when a respective dome 102, 104 is moved into one of the eight positions defined by impressions 128. These positions and corresponding legs 117 may be referred to as points on a compass. For example, when a respective dome 102, 104 is moved into its "resident North" position, which may be selected by the end user, leg 119 may exert a compression force on position sensing means 122 and respective legs 117 adjacent to leg 119 may exert tangential forces on the position sensing means 122. The resultant force exerted by these legs on the position sensing means 122 provides an accurate indication of the movement and position of the respective dome 102, 104. It will be recognized by those skilled in the art that spring 116 may include more or less than eight legs 117 as a function of the number of positions that a respective dome may be moved, the sensitivity of the material from which the spring 116 is formed and/or the stiffness of each leg 117, for example. In one exemplary embodiment the position sensing means 122 may be a transducer or strain gauge such as one known commercially as a PixiPoint from Semtech or a pointer stick device such as the TrackPoint device from IBM. When spring 116 exerts a force on the position sensing means 122 indicative of a change in position of the dome 104, for example, a corresponding data signal may be transmitted to a processing means such as a control processor or circuit board of the keyboard 10 indicative of the dome's position. Alternate embodiments may be configured so that the position sensing means 122 generates the data signal in response to pressure induced on means 122 without the necessity of controller or dome 104 being physically translated. In this aspect, dome 104 may be directly coupled with means 122 so that the data signal is generated in response to pressure exerted on means 122 caused by a user exerting a corresponding pressure on dome 104. This aspect may also be used with various embodiments of the present invention configured to control the operation of hand held computing devices more fully described below.

Figure 3B:
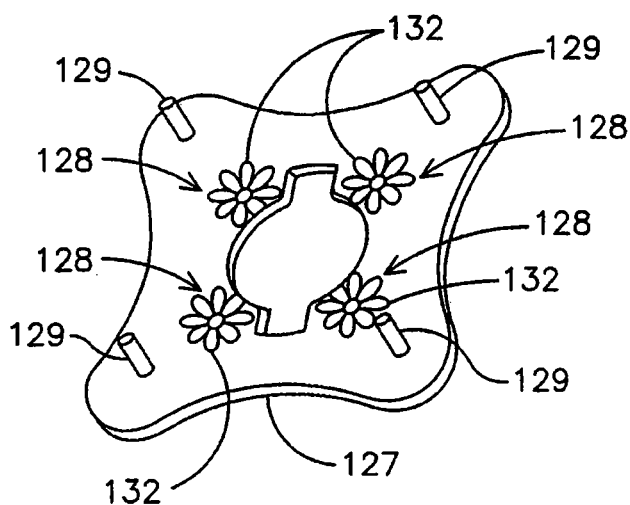
FIG. 3B illustrates a perspective bottom view of the kinematic map plate of FIG. 3A.
Figure 3C:
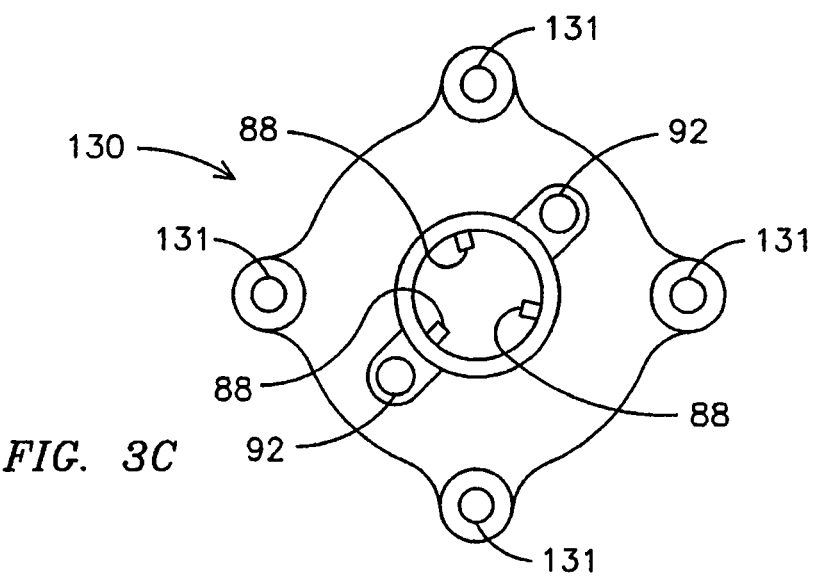
FIG. 3C illustrates a top view of an exemplary embodiment of a spider mechanism show in FIG. 3.
Figure 3D:
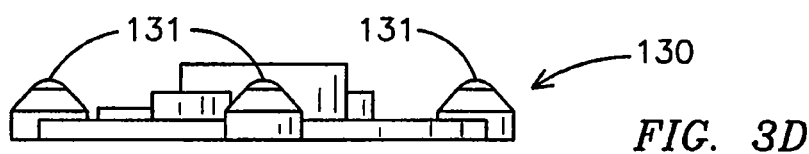
FIG. 3D illustrates a side view of the spider mechanism of FIG. 3C.

Referencing FIG. 5, when a user's hand is positioned on top of dome 104 to slide it when coupled with housing 28, the dome's movement in a horizontal plane substantially perpendicular to central post 142 will cause a corresponding movement of the annulus 106. This can be seen to cause a corresponding motion in the actuator armature 110, which is mounted on the position sensing means 122 via spring 116 below an exemplary upper director plate 124. Actuator armature 110 may form part of a transducer structure, which is coupled to the position sensing means 122. Position sensing means 122 or means for sensing movement of dome 104 may be affixed to a bottom portion 298 of a base plate 299. In one exemplary embodiment, the kinematic map plate 126 may be disposed beneath the annulus 106 as shown in FIG. 5. The underside of the kinematic map plate 126 may contain a plurality of impressions 128. Each impression 128 may include eight symmetrically arranged grooves, for example, that resemble flower pedals as best shown in the bottom view of an alternate embodiment of a kinematic map plate 127 shown in FIG. 3B. In one exemplary embodiment, the underside of the kinematic map plate 126 includes four flower-pedal shaped impressions 128 arranged as shown in FIG. 3B. The kinematic map plate 126 may be disposed above the spider mechanism 130 so that when the spider mechanism 130 is engaged with the kinematic map plate 126 each of the four impressions 128 may matingly engage respective ones of the four posts 131 of the spider mechanism 130. In this respect, the four posts 131 may mate to a center indentation of each of the impressions 128 when the dome 104 is at its center resting location or in its neutral position. Spring 111 acts as a means for biasing the spider mechanism 130 against the kinematic map plate 126 in the embodiment shown in FIGS. 5 and 5A. The center indentation may be slightly deeper than the flower pedal impressions to provide tactile feedback to a user that dome 104 is in its neutral position.

In one exemplary embodiment, the eight flower pedal-shaped impressions 128 define the possible planar movements of the dome 104. In this respect, when dome 104 is moved linearly or laterally from a center resting location in a plane perpendicular to central post 142, a corresponding displacement is induced in the kinematic map plate 126. It will be recognized by those skilled in the art that in alternate embodiments dome 104 may be moved in a plane oblique to central post 142. The flower pedal shaped impressions 128 may function as a guide when mated with the spider mechanism 130 such that the motions of the dome 104 are restricted to the motions allowed for by the impressions 128. An alternate embodiment of the impressions 128 allows them to be shallower so that a user may disengage the dome 104 from the kinematic map plate 126 for moving the dome 104 in a "mouse" mode as more fully described below. The impressions 128 may engage and move along or be guided by the statically located spider tips 131. This provides guidance of the domes 104 into one of eight respective positions, for example, as defined by the impressions 128. The linear displacement of kinematic map plate 126 may only be induced to the extent of the spider posts or tips 131 reaching a point 132 defined by the end of each groove of the impressions 128. Thus, each of the points 132 creates a "stop" to kinematic map plate 126 movement. The extent of the displacement of kinematic map plate 126 needed to reach one of these "stops" defines the point at which the position sensing means 122 may output a location signal indicating a respective position of dome 104. Alternate embodiments allow for the eight-position impressions 128 to be replaced with an aperture having from zero to twelve points 132, for example, and may vary in size as will be recognized by those skilled in the art. Since the transduction of linear displacement into a location signal is software controlled, there is virtually unlimited flexibility inherent in this system.

One exemplary embodiment allows for the kinematic map plate 126 to translate in relation to the upper director plate 124 in both the vertical and horizontal directions. Referencing FIGS. 5 and 5A, vertical translation of the kinematic map plate 126 allows for activation of a switch button 120 via spider mechanism 130. Switch button 120 may allow for switching a respective dome 102 and/or 104 between a "mouse" mode and a "keyboard" mode, for example, or to generate other signals of operation. Movement of dome 104 in the horizontal direction may allow for typing alphanumeric characters when the dome 104 is in the "keyboard" mode and for controlling a cursor when dome 104 is in the "mouse" mode. The switch button 120 may be affixed atop the upper director plate 124 and immediately beneath the spider mechanism 130 but not in contact with the bottom of the spider mechanism 130. When kinematic plate 126 is depressed via dome 104 being pushed downward, spider mechanism 130 may move downwardly, which in turn may depress button 120 mounted on top of upper director plate 124. Button 120 may in turn register activation of the "mouse" or "keyboard" mode. When the spider mechanism 130 activates the "mouse" mode and dome 104 is released, the posts 131 of spider mechanism 130 do not engage the impressions 128 formed on the underside of the kinematic map plate 126 so that the dome 104 may move freely in all directions to control movement of a cursor. When dome 104 is depressed and released again, switch 120 may activate the "keyboard" mode and the posts 131 re-engage the impressions 128 so that the dome 104 may be used to generate alphanumeric and other characters in accordance with aspects of the present invention. In one exemplary embodiment, dome 104 may be used to switch between "mouse" and "keyboard" modes and dome 102 may be used, without the rotation of spider mechanism 130, such that a single depression of a switch button 120 may output a signal to a control processor to activate the "shift" function, a single click (depress then release) activation may enable the "shift lock" function and a double click may activate the "num lock" function. With a single input device embodiment such as a one handed of hand-held device, for example, a switching means, such as switch button 120, may permit the user to "chord" two location signals from one input device to create a keystroke, as more fully described below.

Another exemplary embodiment of the present invention is shown in FIG. 3. In this respect, the annulus 106 and the kinematic map plate 126 shown in FIGS. 5 and 5A may be formed as unitary piece or kinematic map plate 127 as shown in FIGS. 3 and 3A. It will be recognized that the exemplary embodiment of FIG. 3 may form a unitary control assembly that may be removably coupled with the housing 28 so that respective domes 102, 104 may be removed from the housing 28 and used together or independently. FIG. 3A shows a bottom perspective view of the exemplary embodiment of the kinematic map plate 127 shown in FIG. 3. Kinematic map plate 127 may include a plurality of impressions 128 formed on its bottom surface and in one embodiment four symmetrically arranged impressions 128 are formed therein. Kinematic map plate 127 may also include a plurality of posts 129 that may pass through corresponding apertures 133 of an upper director plate 135 and fit within a plurality of corresponding receptacles 137 formed on an actuator armature 139. Each post may have a spring (not shown) inserted there over so that when the posts 129 are fit within respective receptacles 137 a biasing relationship is established so that the kinematic map plate 127 may be vertically translated between an up or at rest position and a down or depressed position via the dome 104, for example. Dome 104 may matingly engage the kinematic map plate 127 by inserting its teeth 112, shown in FIG. 6, over the circumferential teeth 125 formed on the upper side of the plate 127.

Figure 3E:
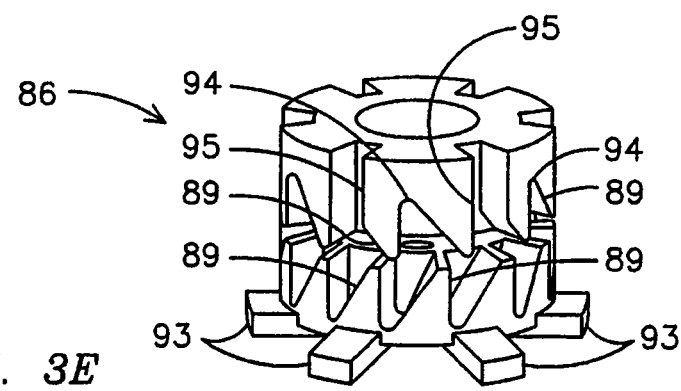
FIG. 3E illustrates a front view of an exemplary ramping or camming mechanism in accordance with aspects of the present invention.

The embodiment of FIG. 3 may include a switch 85 that may be toggled between a "mouse" mode and a "keyboard" mode in the following manner. This may be performed by either dome. A ramping or camming mechanism 86 may be inserted within the center aperture of spider mechanism 130 so that a plurality of camming protuberances 88 within the spider's center aperture engage respective camming surfaces or ramps 89 formed in the camming mechanism 86. FIG. 3E shows a front view of camming mechanism 86. The bottom of camming mechanism 86 may rest on a center portion 90 of the upper director plate 135 so that the central post 142 may be inserted through a center aperture of the camming mechanism 86 when the embodiment of FIG. 3 is assembled. The upper director plate 135 may include two spring-loaded posts 91 that engage corresponding apertures 92 formed in the spider mechanism 130 so that the spider mechanism 130 is biased upwardly when placed over the posts 91. Switch 85 may be affixed to the base of upper director plate 135 so that when the camming mechanism 86 rests on the center portion 90 respective switch activators 93 affixed to the bottom of camming mechanism 86 may toggle switch 85 between a "mouse" mode and a "keyboard" mode when camming mechanism 86 is rotated about the central post 142. In this respect, when the embodiment of FIG. 3 is assembled, a downward or vertical displacement of dome 104, for example, will cause the camming protuberances 88 to engage the camming surfaces 89 and cause the camming mechanism 86 to rotate about the central post 142.

As can be appreciated from the camming surfaces 89 configuration shown in FIG. 3E, the rotation of the camming mechanism 86 will cause the spider mechanism 130 to move between a lower position and a released position. The spider mechanism 130 will be retained in its lower position via the camming protuberances 88 being captured at respective points 94 of the camming surfaces 89 and due to the upward bias created on the spider mechanism 130 by the spring loaded posts 91. When the camming mechanism 86 is rotated into its lower position, a switch activator 93 may engage switch 85 thereby switching the dome 104 into a "mouse" mode. In this mode, the spider mechanism 130 is retained below the kinematic map plate 127 so that dome 104 may move freely in all directions to control a cursor. When the dome 104 is depressed and released again, the camming mechanism 86 rotates so that the camming protuberances 88 follow the camming surfaces 89 into upper channels 95. This allows the upward bias on the spider mechanism 130 to re-engage the tips of the spider posts 131 with the impressions 128 formed on the underside of the kinematic map plate 127. In this position, the switch activator 93 will disengage from the switch 85 so that the dome 104 is in the "keyboard" mode to generate alphanumeric and other characters in accordance with aspects of the present invention. FIG. 3 also illustrates an exemplary guide plate 96 that fits over an exemplary actuator armature 97. A receptacle 98 may be affixed within a base plate 83 that allows for each control assembly or "pod" to be removed from the housing 28 and placed in various locations to accommodate a user's needs such as being coupled to respective arms of a wheelchair, for example. It will be recognized by those skilled in the art that various housings may be used so that respective domes 102, 104 may be separated from each other and independently secured at different locations, for example, to accommodate a specific end user's needs.

Figure 4:
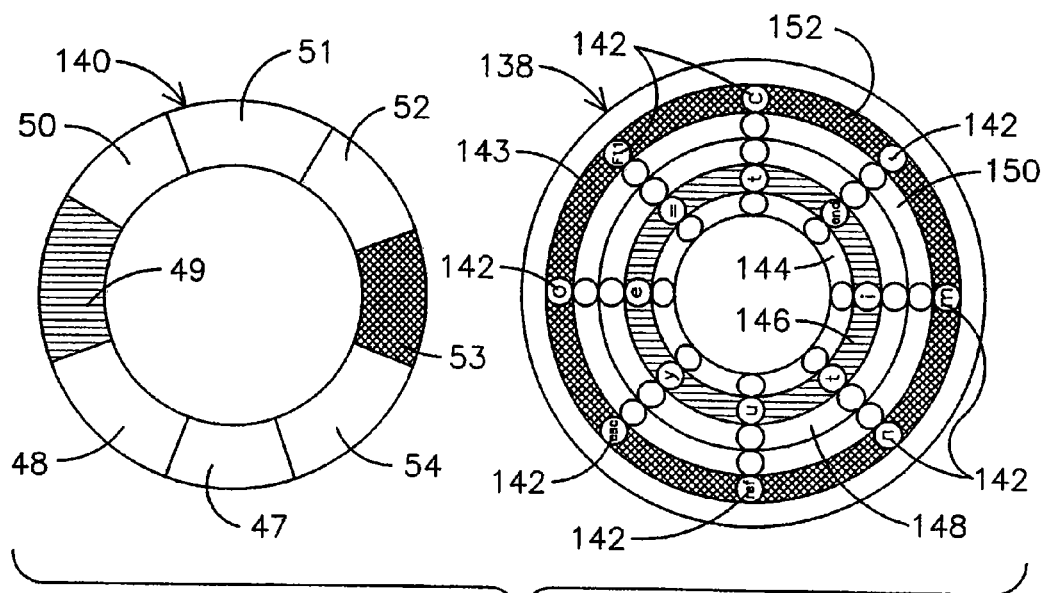
FIG. 4 illustrates an exemplary pair of character definition rings for the keyboard.

Referring to FIG. 4, a character definition ring 138 may be provided with the right-hand input device 104 with indicia that, when used either alone or in concert with a character definition ring 140 on the left-hand input device 102, may provide a correspondence between dome-attitude or position and the keystroke generated. Each ring 138, 140 may overlay respective domes 102, 104 on keyboard 10 shown in FIG. 1. It will be understood that these rings may also be used with the exemplary embodiment shown in FIG. 10. In one exemplary embodiment, each character definition ring 138, 140 may be segmented into eight radial sectors that correspond to the eight flower-pedal points 132 of impression 128 or 346. In this respect, character definition ring 140 may include eight radial sectors 47, 48, 49, 50, 51, 52, 53 and 54 where each sector may be color coded or otherwise patterned to correspond with a color-coding or patterning of character definition ring 138. Ring 138 may include eight radially extending rows containing indicia of alphanumeric characters and/or keyboard functions where each radially extending row corresponds with one of the eight flower-pedal points 132. Each character and/or function within a radially extending row may also lie in one of a plurality of concentric rings such as five concentric rings 144, 146, 148, 150 and 152, for example, that may be color coded or patterned to correspond with the color-coding or patterning of the radial sectors of character definition ring 140 to aid a user in generating a keystroke. In one exemplary embodiment there may be eight concentric rings on ring 138 where each ring is color coded to correspond to one of the eight radial sectors 47, 48, 49, 50, 51, 52, 53 and 54 on character definition ring 140. With this combination of color-coding and indicia on rings 138, 140 two motions may be used to create a single keystroke for generating an alphanumeric character or performing a keyboard function, for example. This is in contrast to a conventional keyboard, which requires the hands to be in an offset relationship with respect to the arm in the normal operation of the keyboard. By using one of various embodiments of the present invention, it is possible to minimize, if not completely eliminate, the strain and stress on the wrist and interconnecting musculoskeletal portions of the wrist, arm, and hands. Additionally, one can anticipate that learning the circular key layout, as well as the dome manipulation technique, will become easier and that accuracy will increase over time. When the dual input device embodiment is utilized using domes 102, 104 data signals may be generated to produce a keystroke or alphanumeric character in at least one of two ways: using a single dome to access one of eight keystrokes available from each device, in response to movement of a dome along impression 128 for example, or using a chordal motion. In "chording" a combination of two signals, one from each device 102, 104 may be translated into a single signal having a unique correspondence with one of a set of keystroke signals. A processing module may be configured with firmware and/or software for interpreting the data signals and translating them into associated alphanumeric characters, for example. It will be recognized by one skilled in the art that the processing module may be programmed with respect to character location and definition to allow a user to create special sets of characters or direct digital control signals as needed.

The generation of data signals for producing keystroke signals will be described with reference to FIGS. 1 and 4. The method of generating such a data signal may be achieved by using devices 102, 104 sequentially or simultaneously, that is, by "chording". Sliding dome 102 into one of the eight colored sectors of the character definition or selector ring 140 provides half of the "chord" needed to output a keystroke signal and indicates to the user in a color-coded or patterned fashion which set of characters of the correspondingly colored or patterned concentric ring on the character definition or selector ring 138 are accessible or able to be produced. For example, if the color red indicated by the red sector (cross-hatched) 53 of character selector ring 140 in FIG. 4 is chosen with the left-hand dome 102, the set of characters 142 shown in the red concentric ring (cross-hatched) 143 on the right hand dome is enabled. Reversing the order of the motions may produce the same character. However, it will be recognized by those skilled in the art that reversing the order of dome movement may produce a different character and/or keyboard function if desired. It will be appreciated that in the exemplary embodiment having eight sectors on ring 140 and eight concentric circles on ring 138 (only five are shown in FIG. 4 for ease of illustration) there are 64 unique keystrokes available and up to 128 when the "shift" function, for example, is enabled. Alternate embodiments allow for keystrokes to be generated by a using a single dome 102, 104 simply by sliding only one dome 102, 104 into a flower pedal point 132 leaving the other dome in its "home" position. The position sensing means 122 may generate data signals in response to movement of the domes 102 and/or 104, as discussed above, that may be transmitted to a control-processing module, which may transmit a respective data signal to a computing device for producing the associated keystroke.

One advantage of this design is that it enables a user to utilize the keyboard 10 with less precision with one hand than the other. In this respect, if a user has less dexterity, etc. in their left hand relative to their right then the embodiment illustrated in FIG. 4 allows the user to slide the left hand dome 102 only once into one radial position of ring 140 and be able to generate eight characters within the corresponding concentric ring of ring 138 with their right hand. Various embodiments of the present invention may allow for either sequential or simultaneous movements of the domes 102, 104 for character generation. It can further be seen that character definition (which may be firmware and/or software controlled) could take into account the user's left or right-handedness by placing those characters that are most often used in positions requiring, for instance, less precision with the left hand than with the right hand. Using a character definition ring 140 with eight radial sectors and a character definition ring 138 with eight corresponding concentric rings and eight radial rows of characters allows for 64 unique keystrokes. One exemplary embodiment allows for activating the switch 120, which may double this number to 128 and in this respect the indicia present on character definition rings 138 and 140 may also comprise a second symbol set indicative of the keystrokes that would be generated with the keyboard 10 placed in the "shift" mode, for example. In one exemplary embodiment, chording to type a capital letter may be accomplished by two sequential or simultaneous linear motions of the domes 102, 104 and may also involve the switch button 120. For example, to generate a data signal indicative of the capital letter "E", dome 102 may be linearly moved into the hatched sector 49 located on the selector ring 140 while depressing that dome to activate the switch button 120 without releasing the vertical pressure on the switch 120. Dome 104 may then be moved left or to the "west" toward the letter "e" that is located in the hatched concentric circle 146 to "type" the capital letter "E".

Figure 7:
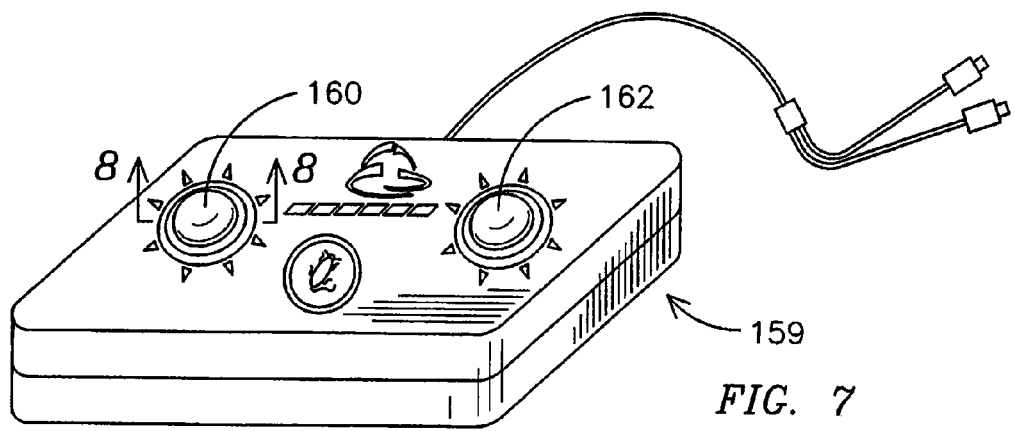
FIG. 7 illustrates an exemplary embodiment of an apparatus that may be hand-held in accordance with aspects of the present invention.

Referring to FIG. 7, there is shown a perspective view of an alternate embodiment of the present invention, which may be a hand-held device 159 in which the domes or palm controls 102, 104 may be implemented in the form of thumb controllers 160, 162. This type of keyboard 10 may typically be used with a hand-held computing device such as PC, Palm Pilot® or Game Boy®, for example, to allow the user to hold the device in two hands and use a thumb of each hand to control the respective thumb controllers 160, 162. The structure underlying the thumb controllers can be a miniaturized version of various embodiments of the present invention.

Figure 8:
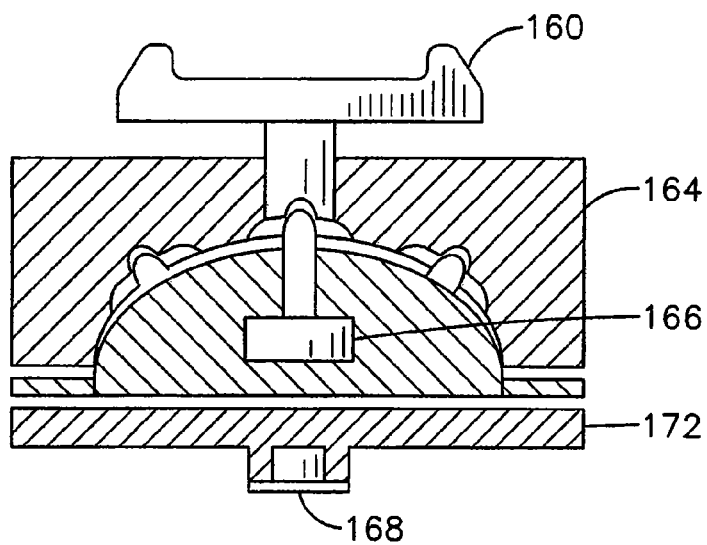
FIGS. 8 and 9 illustrate cross-section and exploded views, respectively, of the apparatus of FIG. 7.
Figure 9:
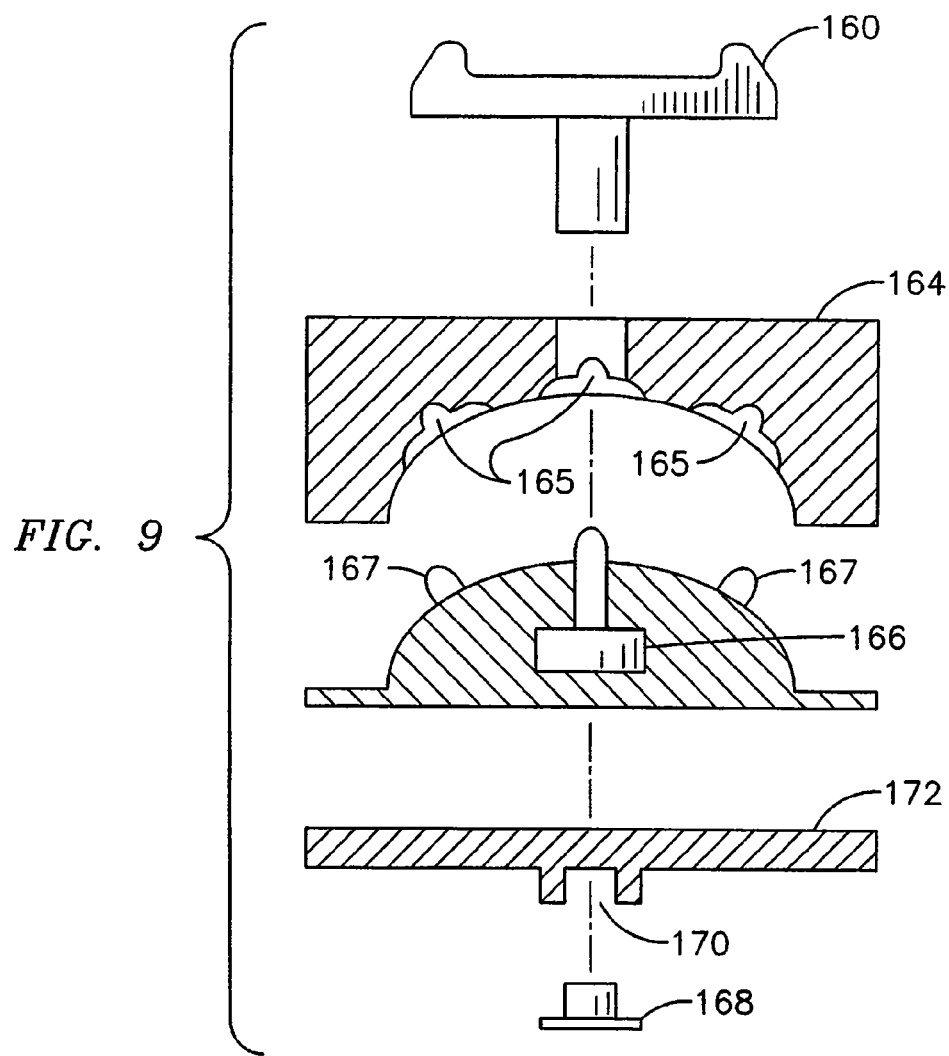

FIG. 8 is a cross-sectional view and FIG. 9 is an exploded view of one exemplary embodiment of the thumb control used in the embodiment of FIG. 7. In FIG. 9, it can be seen that the exposed thumb control 160 may extend through a top housing section 164 and interface with a switching device 166. The switching device 166 may have actuation switches attached to allow sensing of depressing of the switch 166 in a manner similar to that with regard to switch 120 of FIGS. 5 and 5A or switch 334 of FIG. 10. A position sensing means such as a strain gauge pressure switch 168 may fit within a recess 170 in a lower flexible plate 172. The plate 172 may fit against a bottom portion of the switch 166 and senses lateral movement of the switch 166. The strain gauge 168 may be a commercially available type such as those used for controlling the cursor movement in some laptop computers, for example, as mentioned above in reference to position sensing means 122. When the flexible plate 172 rocks in response to movement of the thumb control 160, the sensor may register and send electric signals to a logic board that detects the direction in which the plate 172 is being moved. The previously described flower pedal pattern 128, 346 may be impressed into the upper housing 164 at one or more locations 165. These impressions may be engaged by respective nubs 167 to provide a guiding mechanism for the thumb control 160. This may enable the thumb controller 160 to be guided into eight locations defined by the flower-pedal impressions, for example, for generating a data signal to implement a character generation sequence in accordance with various aspects of the present invention. Alternate aspects of this exemplary embodiment allow for generating data signals for a wide range of applications such as controlling the operation of a hand-held computing device such as an electronic game, for example.

Figure 9A:
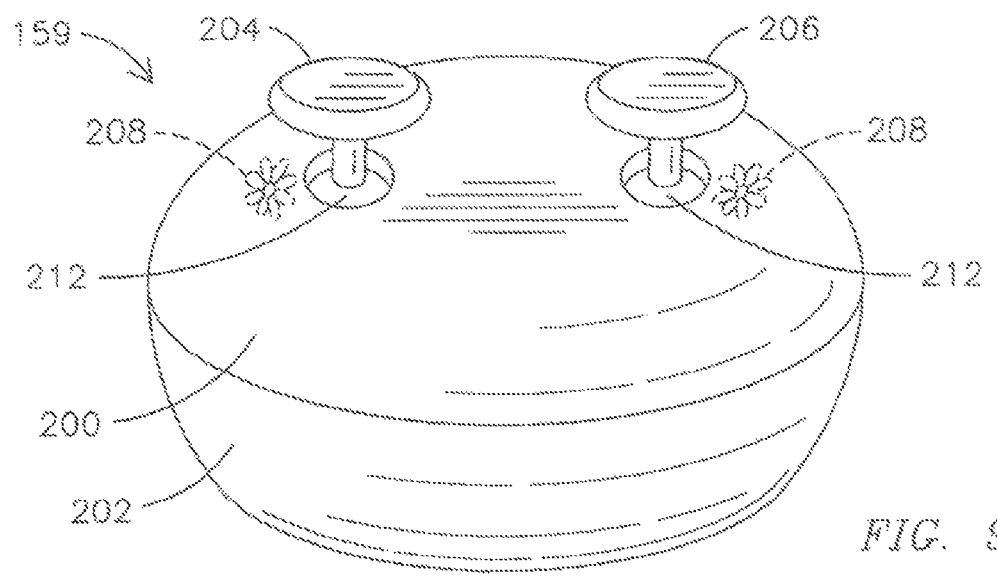
FIG. 9A illustrates a perspective view of an exemplary embodiment of an apparatus that may be hand-held in accordance with aspects of the present invention.
Figure 9B:
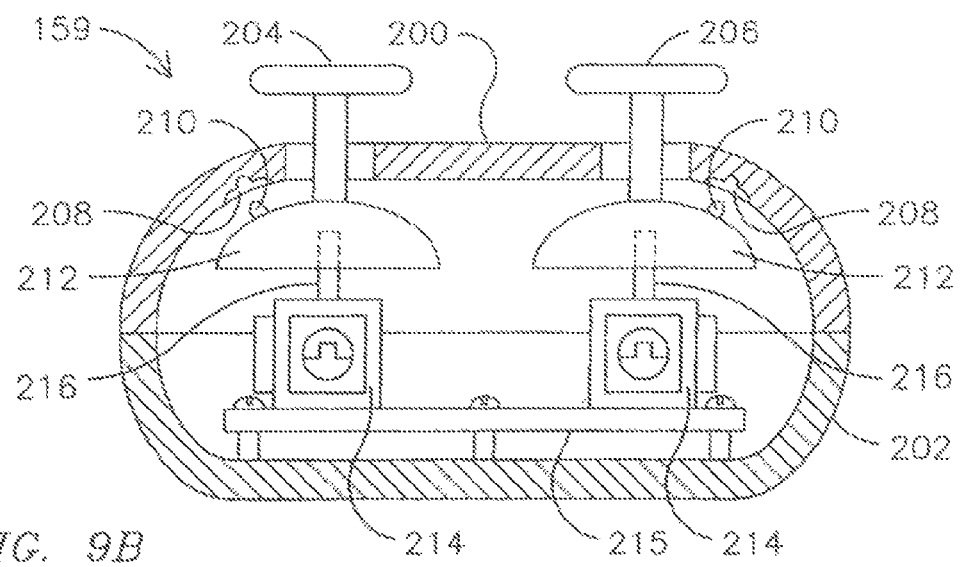
FIG. 9B illustrates a cross-sectional view of the embodiment of FIG. 9A with a different shaped housing.
Figure 9C:
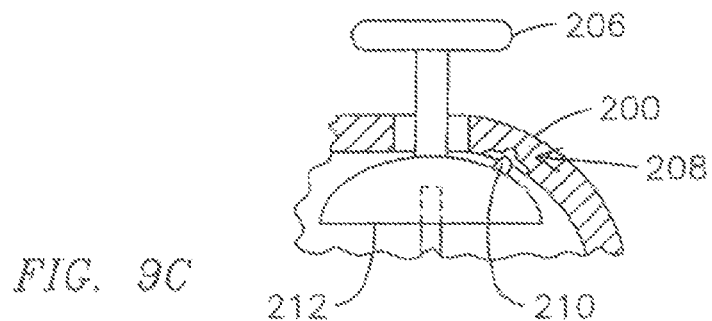
FIG. 9C illustrates front view of an exemplary controller of the apparatus of FIG. 9A.

Another exemplary embodiment of hand-held device 159 is shown in FIG. 9A that may include a top housing 200 and a bottom housing 202 that may house first and second controllers 204, 206. The underside of top housing 200 may include respective flower-pedal impressions 208 that may engage respective nubs 210 affixed to the upper side of a respective controller base piece 212 for guiding the respective controllers among a plurality of positions in accordance with aspects of the present invention. The top housing 200 and controller base piece 212 may be formed to matingly engage when device 159 is assembled, and in one exemplary embodiment the top housing 200 may be formed with a curvilinear or hemispherical surface that engages the base piece 212 formed with matching curvilinear or hemispherical surfaces as illustrated in FIG. 9B. Device 159 may be formed in other shapes such as a disk as shown in FIG. 9A. Controllers 204, 206 may operatively engage respective sensing means 214, via respective shafts 216, mounted on a base plate 215. Sensing means 214 may be a commercially available device, such as a "joystick" assemblage for example, having appropriate sensing means for detecting movement in accordance with aspects of the present invention. The underside of controllers 204, 206 may include a centrally aligned recess for receiving respective shafts 216 so that shafts 216 move in response to movement or "rocking" of the controllers. Sensing means 214 may include a pair of potentiometers for registering movement of respective controllers 204, 206 and send electronic data signals to a logic board for generating data signals in accordance with various aspects of the present invention. Sensing means 214 may also include an internally located switch (not shown) situated beneath shaft 216 that may be activated and deactivated by depressing a respective controller 204, 206. The switch may be configured to change the control logic of device 159 so that it switches between modes in accordance with various aspects of the present invention. For example, this switch may cause device 159 to switch among the "Num Lock", "Caps Lock" and "Shift" modes, for example. FIG. 9B illustrates top housing 200 positioned away from the respective controllers 204, 206 for ease of illustration. When device 159 is assembled, the impressions 208 may engage respective nubs 210 as best shown in FIG. 9C.

Figure 9D:
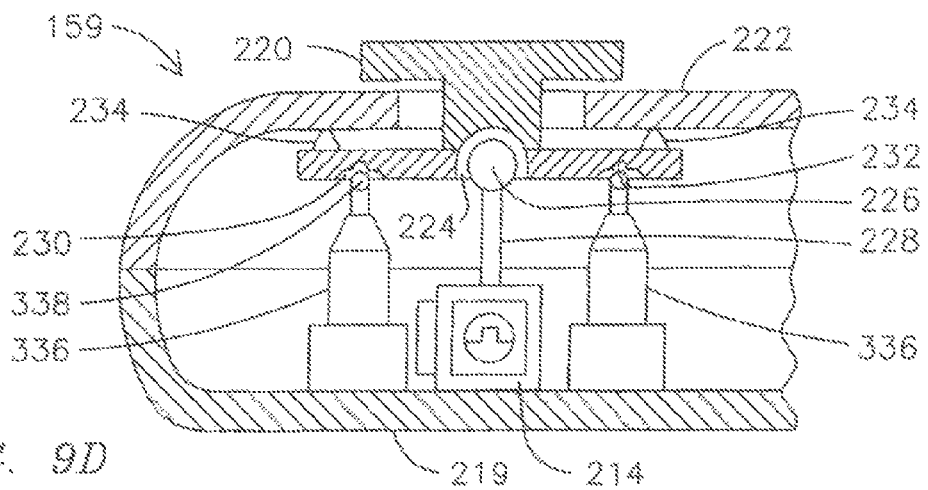
FIG. 9D illustrates a cross-sectional view of an exemplary embodiment of an apparatus that may be hand-held in accordance with aspects of the present invention.

FIG. 9D illustrates another exemplary embodiment of a control arrangement of device 159 that may include a bottom housing 219 and a controller 220 situated within a top housing 222 so that controller 220 may be moved from a home or neutral position in a plurality of directions radially extending from the home position, that may be defined by a flower-pedal impression 230, in accordance with various aspects of the present invention. It will be appreciated that FIG. 9D illustrates one control arrangement and that device 159 may include a functionally equivalent second control arrangement not shown. Controller 220 may include a centrally located recess 224 for receiving ball 226 positioned on top of shaft 228 that is operatively extending from sensing means 214, described above, mounted to the bottom housing 219. The underside of controller 220 may include a flower-pedal impression 230 that engages a ball bearing 338 affixed to the top of a spring-loaded ball plunger 336 affixed to the bottom housing 219. The underside of controller 220 may also include a concave recess 232 that engages a ball bearing 338 affixed to the top of a spring-loaded ball plunger 336, which may include a snap ring arrangement as described above, affixed to the bottom housing 219. In this respect, controller 220 may slide within a substantially planar surface among the home position and the radially extending positions defined by impressions 230 so that sensing means 214 detects the position of the controller 220 and generates a data signal that may be indicative an alphanumeric character, for example, in accordance with aspects of the present invention. Controller 220 may also be depressed to activate and deactivate a switch within the sensing means 214 to cause device 159 to shift between various modes as described above. A pair of friction reduction nubs 234 may be affixed to the controller 220 so they engage the underside of top housing 222.

Figure 9E:
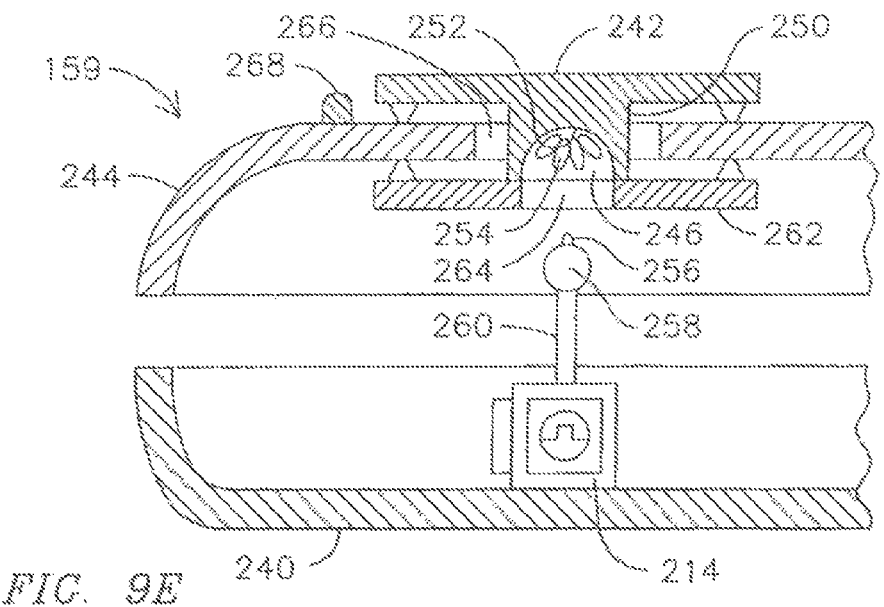
FIG. 9E illustrates another exemplary embodiment of an apparatus that may be hand-held in accordance with aspects of the present invention.

FIG. 9E illustrates another exemplary embodiment of device 159 that may include a bottom housing 240 and a controller 242 situated within a top housing 244 so that controller 220 be moved in a plurality of directions within a substantially planar surface of the top housing 244. It will be appreciated that FIG. 9E illustrates one control arrangement and that device 159 may include a functionally equivalent second control arrangement not shown. Controller 242 may have an insertion 246 housed therein that receives a ball 248 when top housing 244 and bottom housing 240 are assembled. One exemplary embodiment allows for the insertion to be formed as a cube or have at least one flat surface that abuts a corresponding flat surface formed on an inside surface of centrally located collar portion 250 of the controller 242 to prevent the insertion 246 from rotating when controller 242 is be used. Insertion 246 may include a hemispherical inner surface 252 within which a plurality of impressions, such as flower-pedal impressions 254, may be formed therein. In this respect, the flower-pedal impressions 254 may be formed within the curvilinear surface of the hemispherical inner surface 252 and may engage a guide knob 256 formed on top of a guide ball 258. The top housing 244 is shown broken away from bottom housing 240 for ease of illustration it being understood that when device 159 of FIG. 9E is assembled the guide knob 256 and ball 258 may fit within the flower-pedal impressions 254 for guiding the controller 242 among the directions defined by the flower-pedal impressions 254 and for causing the guide ball 258 to move in a direction corresponding to movement of the controller 242. Guide ball 258 may be attached to a shaft 260 extending from a sensing means 214, described above, affixed to the bottom housing 240. As the controller 242 is moved the corresponding movement of guide ball 258 and consequently shaft 260 may cause the sensing means 214 to generate data signals indicative of the controller's 242 direction of movement.

One exemplary embodiment of the device 159 shown in FIG. 9E allows for a biasing means, such as a compression spring, to be inserted within the collar portion 250 of controller 242 prior to placing insertion 246 therein to create a downward bias on the insertion 246 so that it is maintained in engagement with guide knob 256 and guide ball 258 when device 159 is assembled. A base plate 262 may be affixed to the controller 242, such as by gluing, and include a centrally located aperture 264 that may align with the collar portion 250 of the controller 242 and within which the insertion 246 may be fit. Controller 242 and base plate 262 may be substantially circular, for example, or other shapes as will be recognized by those skilled in the art. The exemplary embodiment of FIG. 9E illustrates the controller 242 and base plate 262 resting against respective upper and lower surfaces of top housing 244 via respective friction reduction nubs. An alternate embodiment allows for the controller 242 to be sufficiently raised above the upper surface of the top housing 244 when the guide knob 256 and ball 258 are engaged with the flower-pedal impressions 254 so that the controller 242 may be depressed and released to active a switch contained within the sensing means 214 for switching the device 159 between modes in accordance with aspects of the present invention. In one exemplary embodiment, a circumferential gap 266 may be formed around the collar portion 250 of controller 242 to define a distance that controller 242 may be translated in order to register movement of the controller 242. The gap 266 may be sized slightly smaller than the distance from the peripheral edge of controller 242 to a raised ridge 268 that may extend around the perimeter of controller 242. Gap 266 provides a user with tactile feedback that controller 242 has been moved a sufficient distance to register its movement. Raised ridge 268 may function as a means to prevent controller 242 from rotating during use or alternate means may be provided.

Figure 9F:
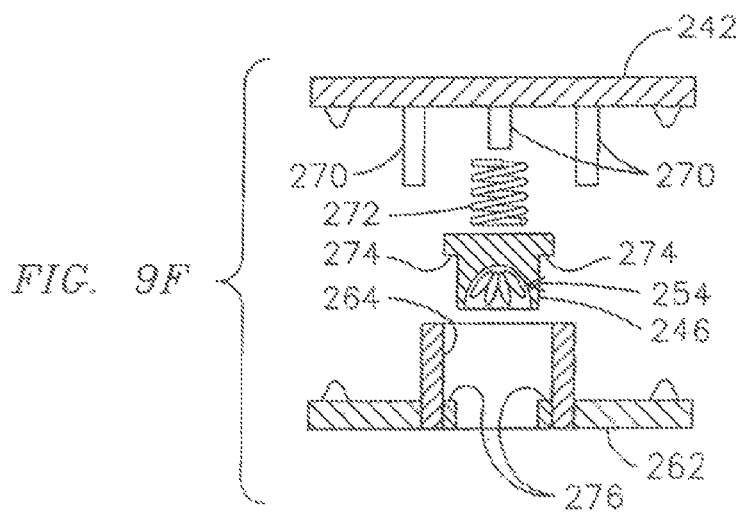
FIG. 9F illustrates a cross-sectional view of an exemplary embodiment of an assemblage that may be used with various embodiments of the present invention.

Another exemplary arrangement of the device 159 of FIG. 9E is illustrated in FIG. 9F and may include controller 242 having a plurality of extensions 270 extending downwardly from its lower surface. A biasing means such as compression spring 272 may be captured at its upper end by the centrally disposed extension 270 and rest on top of insertion 246 when the device 159 is assembled. Insertion 246 may include ridges 274 that may impinge corresponding ridges 276 to prevent insertion 246 from passing through central aperture 264 of the base plate 262 when device 159 is assembled or during assembly. Controller 242 may be coupled with bottom housing 240 by means of the exterior extensions 270. When controller 242 and bottom housing 240 are coupled and assembled within device 159 the impressions 254 formed within the insertion 246 may matingly engage the guide knob 256 and guide ball 258 shown in FIG. 9E. It will be recognized by those skilled in the art that various aspects of the exemplary embodiments illustrated in FIGS. 9A-9F may be adapted or modified to fit into a wide range of electronic device housings, such as hand-held electronic game housings for example, and generate data signals having specific characteristics to operate a specific device or interface with other devices.

Figure 10:
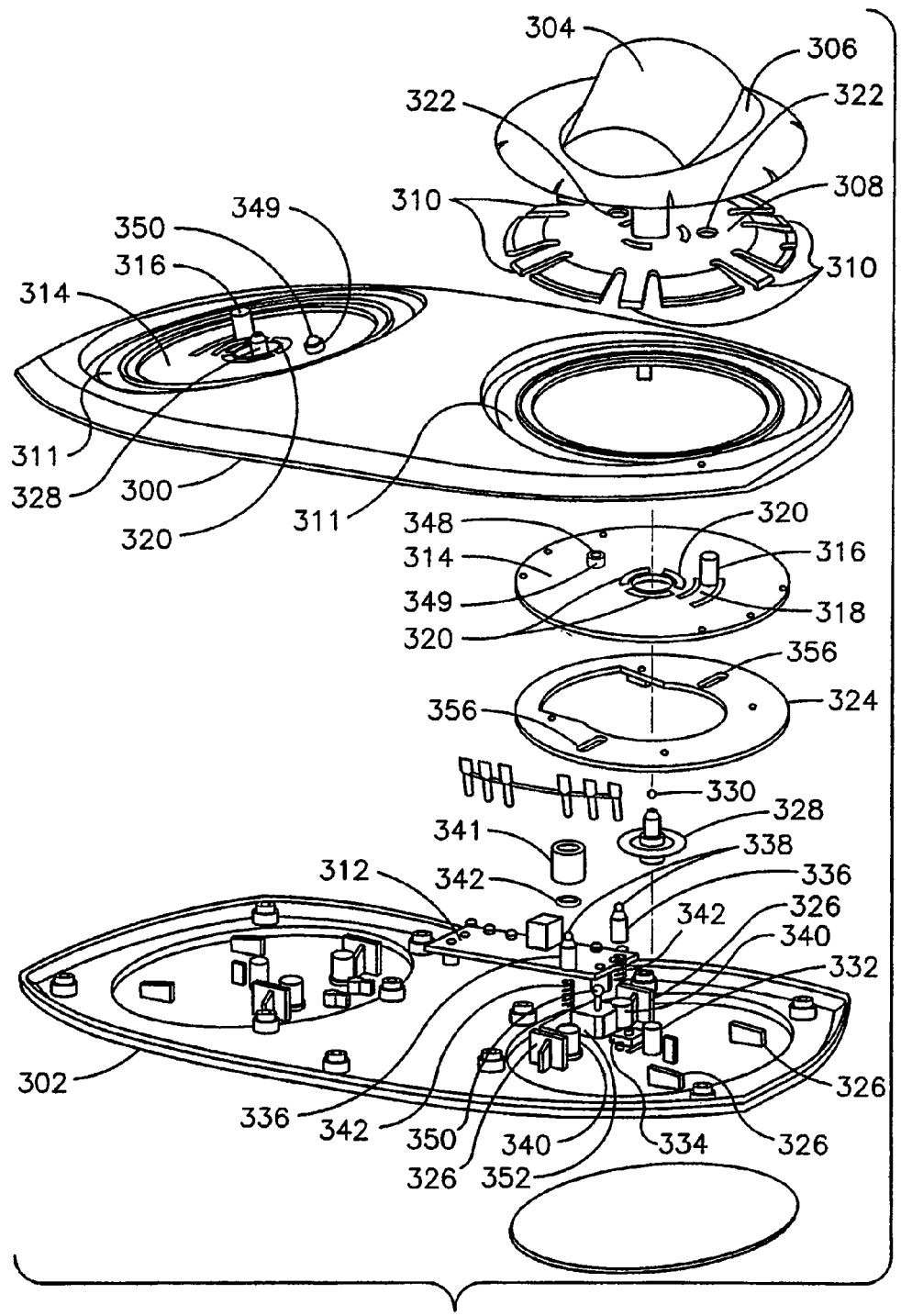
FIG. 10 illustrates an exploded view of another exemplary embodiment of the present invention.
Figure 11:
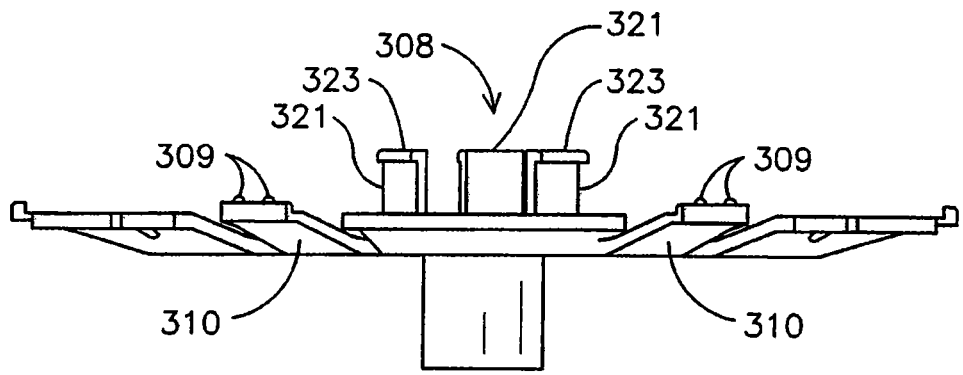
FIG. 11 illustrates an exemplary embodiment of the dome plate of FIG. 10.

FIG. 10 illustrates an exploded view of another exemplary embodiment of the present invention. A top housing 300 may be connected with a bottom housing 302 to form a housing for an exemplary embodiment of keyboard 10. The structure and functionality of the exemplary embodiment of FIG. 10 will be described with reference to the right hand side of keyboard 10 it being understood that the structure and functionality of the left hand side may be identical except for those differences described herein. The left hand side of keyboard 10 is shown with certain corresponding structure described for the right hand side. A right dome 304 is provided that may be shaped to conform to the palmar architecture of a user's right hand substantially at rest. The right dome 304 may include a grooved portion or indentation 306 within which a user may rest a finger during use such as the pinky or little finger. Dome 304 may be attached to a dome plate 308, more clearly shown in FIG. 11, that may include a biasing means, such as a plurality of symmetrically disposed cantilever arms 310, for creating a "spring back" effect when the dome 304 is coupled with the top housing 300. This "spring back" effect provides a user with tactile feedback when generating data signals to a control circuit board 312 as more fully described below. This tactile feedback indicates to a user that dome 304 has been sufficiently depressed to generate a data signal. The underside of each distal end of the plurality of cantilever arms 310 may include one or more protuberances or nubs 309 that may rest against a surface 311 of the top housing 300 when the dome 304 is coupled with the top housing 300. Nubs 309 may reduce the friction between the distal ends of the cantilever arms 310 and the surface 311 when the dome 304 is moved in various directions.

Figure 12:
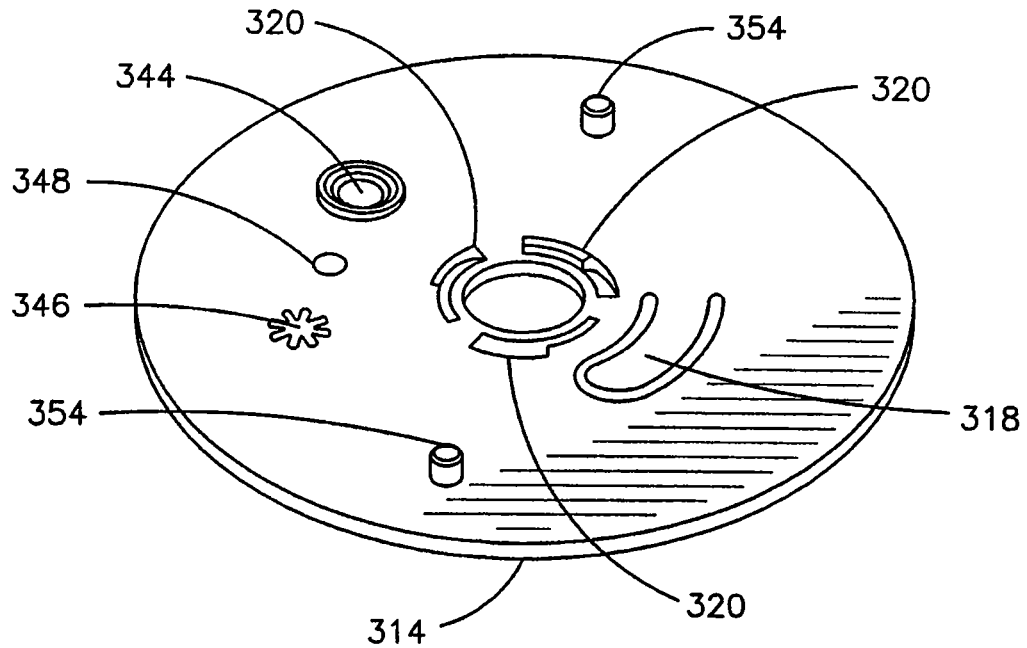
FIG. 12 illustrates a bottom perspective view of an exemplary embodiment of a director plate shown in FIG. 10.

A director plate 314 may include a post 316 supported on an arcuate cantilever arm 318 for mating with the dome plate 308 and coupling the dome 304 to the top housing 300. In this respect, the director plate 314 may include at least one slot 320 having an offset width for receiving respective locking tabs 321, shown in FIG. 11, affixed to the underside of the dome plate 308. Each locking tab 321 may have a flange 323 formed on its distal end that is inserted through the wider portion of a corresponding slot 320, as best shown in FIG. 12, so that when the dome plate 308 is turned relative to the director plate 314 a locking tab 321 will slide into the narrower portion of a corresponding slot 320 and the associated flange 323 will slide underneath the bottom of the director plate 314. When coupling the dome plate 308 to the director plate 314 in this manner, the post 316 will impinge the underside of the director plate 314 when the locking tabs 321 are initially inserted into the wider portion of respective slots 320. In this position, the cantilever arm 318 creates an upward bias so that as the dome plate 308 is turned relative to the director plate 314 the upper end of the post 316 will slide along the underside of the director plate 314 and be urged upwardly into a respective aperture 322 formed in the director plate 314. When post 316 snaps into a respective aperture 322 the dome 304 is coupled with the top housing 300.

A guide plate 324 is provided that may rest on respective guide walls 326 that allow for sliding the dome 304 laterally or "east" and "west" when coupled with the top housing 300. Corresponding guide rails (not shown) may be formed on the underside of the guide plate 324 that fit over respective ones of the guide walls 326. A button plunger 328 may have a ball bearing 330 affixed centrally on its top when button plunger 328 is placed over a corresponding plunger post 332. A compression spring (not shown) may be inserted within the plunger post 332 for creating an upward bias on the plunger button 328 so that it may be depressed and released in response to pressing down and releasing dome 304 to activate a switch 334. A pair of ball plungers 336 may be provided having respective ball bearings affixed to their tops when coupled with the bottom housing 302. Ball bearings 338 may engage the underside of the director plate 314 when the keyboard 10 is assembled as more fully described below. The ball plungers 336 may be placed within respective housings 340, each having a compression spring 342 placed therein for creating an upward bias on the ball plungers 336. One of the ball plungers 336 may include a snap retainer 341 and a snap ring 342 that may be placed over the respective ball plunger 336 so that a portion of the plunger 336 extends above the top of the snap retainer 341 when inserted into housing 340. The snap retainer and ring may provide auditory and/or tactile feedback to a user that the dome 304 has been translated a sufficient distance indicating the proximate end of a keystroke in accordance with aspects of the present invention. In this respect, referencing FIG. 12, the underside of the director plate 314 may include a concave impression 344 that centrally receives the plunger 336 having the snap retainer and ring arrangement when the keyboard 10 is assembled. Plunger 336 is depressed by the curvature of impression 344 in response to movement of dome 304. Plunger 336 may move downwardly a distance that coincides with the dome 304 moving approximately three fourths of its total travel, for example, for generating a data signal at which time the snap retainer and ring will "snap" providing feedback to the user. The engagement of the concave impression 344 and associated plunger 336 also help to re-center the dome 304 after generating a data signal.

Means for guiding dome 304 may be provided as a patterned impression 346 formed in the underside of the director plate 314 for receiving the other one of the ball plungers 336. The impression 346 may be a flower-pedal arrangement having eight grooves within which respective ball bearing 338 may be received to guide the dome 304 in a plurality of directions for generating alphanumeric characters in accordance with aspects of the present invention. Alternate means for guiding dome 304 will be recognized by those skilled in the art such as a similarly patterned aperture in director plate 314, for example. An aperture 348 and associated cylindrical extension 349 may be formed in the director plate 314 for receiving a guide ball 350 affixed to the top of an arm vertically extending from position sensing means 352 when keyboard 10 is assembled. In this respect, guide ball 350 may be situated within the cylindrical extension 349 and consequently move in response to movement of dome 304. Guide ball 350 in turn moves the vertically extending arm or shaft that is pivotally connected at its base within the position sensing means 352. The position sensing means 352 may generate a data signal to the control circuit board 312 in response to movement of the vertically extending arm indicative of the dome's 304 movement and/or position. The control circuit board 312 may be programmed to interpret the data signals received from the position sensing means 352 to generate a corresponding data signal indicative of an alphanumeric character to be produced and/or a keyboard function to be performed. The underside of director plate 314 may also include a pair of guide posts 354 that fit within respective slots 356 of the guide plate 324 that allow for guiding the dome 304 in a "north" and "south" direction when keyboard 10 is assembled.

Figure 13:
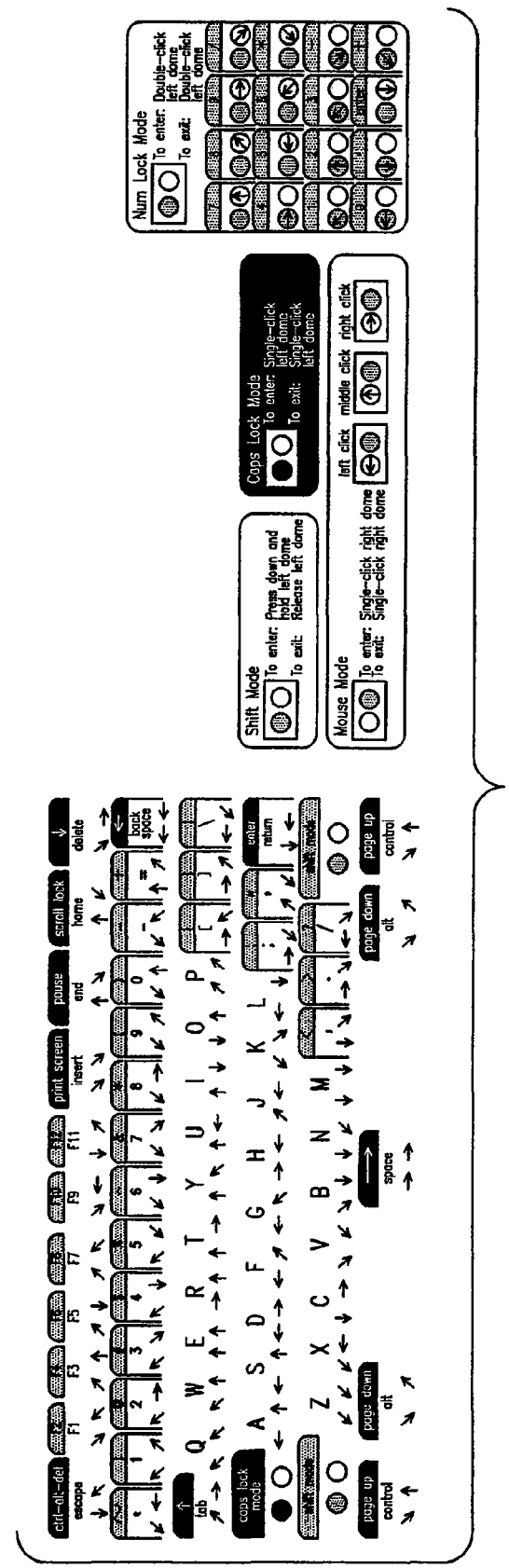
FIG. 13 illustrates an exemplary embodiment of a keyboard layout in accordance with aspects of the present invention.
Figure 14:
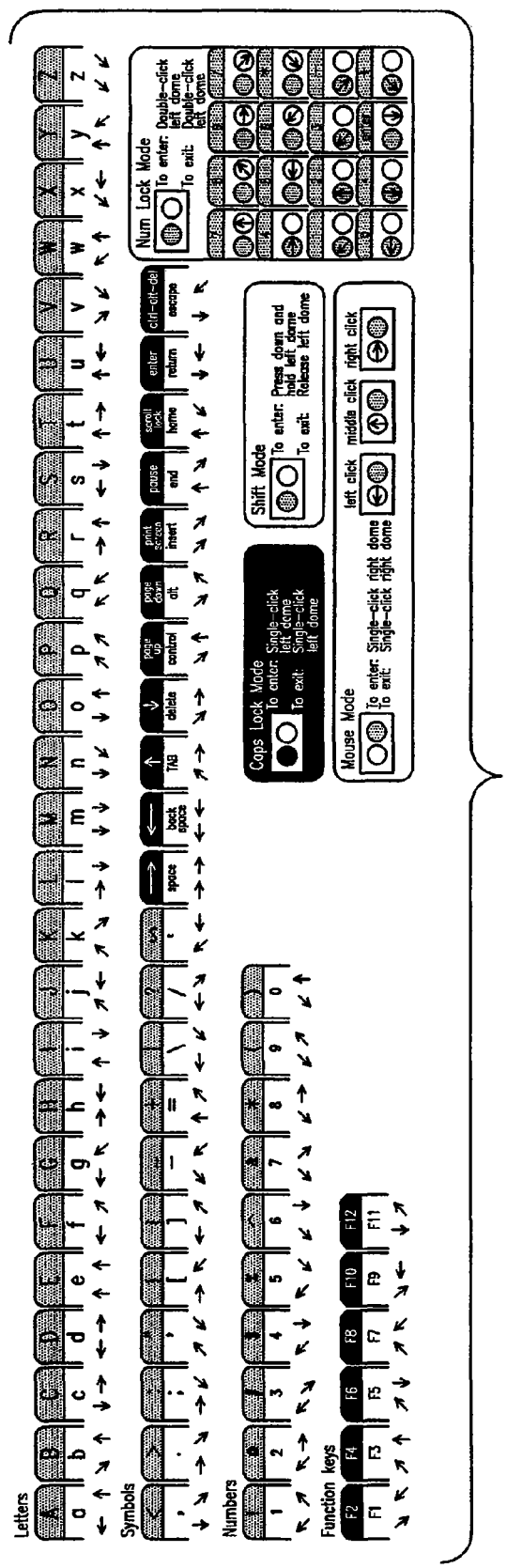
FIG. 14 illustrates another embodiment of the keyboard layout of FIG. 13.

FIGS. 13 and 14 illustrate an exemplary embodiment of a keyboard layout in accordance with aspects of the present invention. One exemplary embodiment allows for the layout to be based at least in part on an association between movements of domes 303, 304, as well as the domes of other embodiments of the present invention, and the hand-motions that would be used on the traditional QWERTY layout. It will be recognized by those skilled in the art that associations may be made, in accordance with aspects of the present invention, between exemplary embodiments of the present invention and keyboard layouts other than a QWERTY keyboard layout. For example, aspects of the present invention may be used with any customized and/or user defined alphabet and/or alphanumeric character layouts. On a QWERTY keyboard, a 1:1 input to character output ratio is employed in that one character is generated by one key being pressed. Exemplary embodiments of the present invention allow for a 2:1 input to character output ratio such that two inputs, one from each hand, may be used to generate a data signal to produce one character output. In order to associate the QWERTY layout to exemplary embodiments of the present layout, movement of domes 303, 304 are based in part on the kinesthetic feel of typing on the QWERTY keyboard layout. This approach is advantageous in that there is a high correlation of kinesthetic feel between exemplary embodiments of the present invention and finger motions associated with using the QWERTY keyboard layout in accordance with traditional typing methodology. In this respect, the hand and finger motions used to generate characters between the respective layouts are related. This allows users who are familiar with using a QWERTY keyboard to quickly learn the exemplary layouts disclosed herein, which minimizes training time. Much of the gross kinesthetic feel between the two keyboard layouts is maintained. It also allows the user to retain this kinesthetic relationship if the user returns to using the QWERTY layout.

The "home row" keys of a QWERTY keyboard in accordance with traditional typing methodology are "a, s, d and f" for fingers of the left hand and "j, k, l and ;" for fingers of the right hand. With the exception of these "home row" keys, a QWERTY user will move respective fingers in a particular direction to access all other keys on the keyboard. In accordance with aspects of the present invention, each direction a QWERTY user moves a finger may be associated with a point of a compass. For example, when typing the letter "q" on a QWERTY keyboard, the left pinky finger moves "northwest". In typing the same letter with the exemplary layout of FIGS. 13 and 14, the left dome, and therefore the left hand, may also move in the "northwest" direction. In this respect, the user's sense of knowing the direction the fingers move on a QWERTY keyboard is retained when using an exemplary layout of the present invention. Similarly, using the position of a user's hands on the "home row" keys of a QWERTY keyboard as reference points, every key has a relative location on the keyboard and is located in a direction away from one or both of the user's hands. For example, the letter "h" is located to the right or "east" of the user's left hand, even though the left hand is not used to stroke the "h". One aspect of the present invention allows for moving a dome in the direction of a letter's location on the QWERTY keyboard layout to generate a data signal for producing a keystroke even if the hand moving that dome would not be used to produce the letter on a QWERTY keyboard. For example, to generate a keystroke for the letter "h" using the exemplary layout of FIGS. 13 and 14, the left dome may be moved to the right or "east", and the right dome may be moved to the left or "west", which is the direction a user would move their "pointing" finger to type "h" on a QWERTY layout. Additionally, moving the left dome "east" and the right dome "west" may be visualized to an end user as making the horizontal bar of an "H", which creates another kinesthetic association for a user between dome movement and character generation. Similarly, moving the left dome "southeast" and the right dome "southwest" to generate a data signal indicative of the letter "v" creates a similar kinesthetic association for a user. A dome may also be moved in a direction based on the relative location of a key on the QWERTY keyboard. The same holds true for associating any key on a standard keyboard layout used with a personal computer, which typically includes a QWERTY layout section, used as an interface device with a personal computer to the movement of one or more domes 303, 304 for generating a data signal.

Another aspect of the present invention allows for generating a keystroke by moving a first dome 303, 304 in the general compass direction of the character as it is found on a QWERTY layout and moving a second dome in a direction that is at least a function of the ease of dome movement and/or the frequency with which that character is used. In this respect, when generating a keystroke for a character having a high relative frequency of use, one aspect allows for moving one of the domes in a compass direction that is relatively easier for a user to use. It has been determined that moving or directing a dome in one of the "north", "south", "east", or "west" directions is typically easier for a user than moving or directing a dome in the "northwest", "northeast", "southeast" or "southwest" directions. When generating a data signal for producing an alphanumeric character having a low relative frequency of use, a dome may be moved or directed into one of the "northwest", "northeast", "southeast" or "southwest" directions. These four positions or directions are typically less easy for users to direct the dome and may therefore be used with less frequency. For example, the letter "e" is the most commonly or frequently used character in the English alphabet. The exemplary layout of FIGS. 13 and 14 allow for a left hand motion that is up or "north" and a right hand motion that is up or "north" for generating a keystroke to produce the letter "e". In this respect, movement of the left dome is associated with the kinesthetic feel of a user's left hand, as it would be done to activate the "e" key on a QWERTY keyboard. That is, the left dome moves in the direction a user's middle finger would move to activate the "e" key. This is generally in an up or "north" direction. Movement of the right dome is also up or "north" because it has been determined that the "north" position or direction is typically the easiest for users to move the dome of the "north", "south", "east" or "west" directions and "e" is a character having a high relative frequency of use.

The letter "a" is also a character with a high relative frequency of use. To generate a data signal or keystroke for producing the "a" character, the exemplary layout allows for a left hand motion that is to the left or "west" and a right hand motion that is in the up or "north" direction. Because the letter "a" is a "home row" key it requires no movement of a user's finger for its production on a QWERTY keyboard other than to press the "a" key with the user's left pinky finger. In this respect, the association between movement of the left dome and the QWERTY keyboard layout is the relative location of the letter "a" on the QWERTY keyboard. This is, the "a" is located on the left side of the QWERTY keyboard. Consequently, the left hand movement of the dome is in the left or "west" direction and the right hand movement or motion is in the up or "north" direction because the letter "a" is a character having a high relative frequency of use and the "north" direction is relatively easier for users to move a dome.

One aspect of the exemplary layout of FIGS. 13 and 14 allow for generating a keystroke to produce the letter "z" by moving the left hand and dome in the "southwest" direction and moving the right hand and dome in the same or "southwest" direction. In this respect, either one of the domes may be moved in the "southwest" direction because that is the relative direction of that letter's location of the QWERTY keyboard. That is, the letter "z" is located in the "southwest" corner of the QWERTY keyboard. The other one of the domes may also be moved in the "southwest" direction because the letter "z" has a low relative frequency of use and the "southwest" direction is a direction that is relatively less easy for a user to move a dome. As will be appreciated with reference to the exemplary layout of FIGS. 13 and 14, a combination of dome movements has been determined in accordance with aspects of the present invention to generate a keystroke for producing alphanumeric characters such as those found on a standard computer keyboard used as an interface device with a standard personal computer, for example. This exemplary layout also allows for executing functions found on a standard computer keyboard such as a "shift" mode, a "mouse" mode, a "caps lock" mode, a "num lock" mode, for example. As indicated on the exemplary layout, some of these functions may require depressing or "clicking" one or more of the domes 303, 304. In this respect, a dome 303, 304 may be depressed to activate and deactivate these functions in accordance with embodiments of the present invention.

The exemplary keyboard layouts illustrated in FIGS. 13 and 14 may include a color-coding for the arrows associated with each key on the layout such as coding the left arrow yellow and the right arrow blue for ease of reference by a user. Correspondingly colored markings may be included on the periphery of respective surfaces 311 at the eight compass points or directions into which a respective dome 303, 304 may be moved. This color-coding allows a user to easily associate a respective dome 303, 304 and the direction in which it is to be moved to generate desired data signals for producing an alphanumeric character. One exemplary embodiment of the apparatus illustrated in FIG. 10, and as indicated in FIGS. 13 and 14, allows for entering a "Num Lock" mode by double clicking left dome 303, which may activate switch 334 for entering that mode. Control circuit board 312 may be programmed to receive a data signal from switch 334 to switch the control logic of the apparatus into and out of the "Num Lock" mode. The "Num Lock" mode allows for generating data signals for producing the alphanumeric characters on the numbers pad by moving only one dome such as right dome 304. The "Shift" mode may be activated by pressing down and holding the left dome 303, the "Caps Lock" mode may be activated by single clicking the left dome 303 and the "Mouse" mode may be activated by single clicking the right dome 304. Each of these movements may activate a respective switch 334, which in turn may interact with the control circuit board 312 to switch the control logic among these functions. Alternate embodiments allow for various combinations of dome "clicking" to activate and deactivate various functions such as single clicking each dome 303, 304 to enter the "Caps Lock" mode, for example. When the "Mouse" mode is activated, the control circuit board 312 switches the control logic so that domes 303, 304 function for cursor control. In this respect, one dome may control the movement of the cursor and the other may perform the left, middle and right clicks of a conventional mouse as indicated on the exemplary layouts of FIGS. 13 and 14. Regarding cursor control, the impressions 346 formed on the underside of the director plate 314 may be sufficiently shallow so that a user may "jump" the respective ball bearing 338 out of or over the impressions to freely control movement of the cursor. This allows the arm vertically extending from position sensing means 352 to be freely pivoted in 360° for controlling the cursor movement.

Certain keyboards and associated software known in the art that are used with personal computers employ a function commonly referred to as "sticky keys". Enabling the "sticky keys" function allows a user to sequentially depress a combination of keys to execute a function rather than having to depress and hold those keys down simultaneously, which may be difficult for some users to do such as those having arthritic hands. For example, depressing and holding the "Ctrl", "Alt" and "Delete" keys on a standard keyboard will pull up a Task Manager in some versions of the Windows operating system. With "sticky keys" enabled, a user may press and release these keys in sequence to pull up the Task Manager. Exemplary embodiments of the present invention may include a "sticky key" function. In this respect, referring to FIG. 11 or 12, a "sticky key" function may be provided for the "Ctrl" and/or "Alt" functions. One exemplary embodiment allows for activating the "Ctrl" function by moving a first controller, such as dome 303, "southeast" and a second controller, such as dome 304, "north", allowing the controllers to return to their respective home positions. With the "Ctrl" function activated, a user may then enter a series of alphanumeric characters, for example, by moving respective controllers in the directions indicated on the exemplary layouts of FIG. 11 or 12 that represent an executable function such as a command or other instruction. After entering these alphanumeric characters, the user may then execute the function by deactivating the "Ctrl" function by moving the first and second controllers in the respective directions indicated above. The "Alt" function may be similarly executed. Respective LEDs may illuminate on the surface of device 10 when the "Ctrl" and "Alt" functions are enabled, as well as other functions, in this manner to indicate to a user that the respective "sticky key" functions are activated.

It will be recognized by those skilled in the art that the various embodiments of an interface device, such as keyboard 10, may be used to generate electronic data signals that may be used to perform a wide range of functions and are not limited to data signals that may be used to produced alphanumeric characters and/or to execute standard keyboard functions. For example, software and/or firmware may be configured to interpret data signals produced in accordance with aspects of the present invention to interact with and/or control a range of electronic devices such as computer games, simulators, robots, telecommunications equipment or other devices responsive to an electronic data signal. Embodiments of keyboard 10 may be configured to transmit data signals over wireless communications mediums as will be recognized by those skilled in the art.

It will be recognized by those skilled in the art that the exemplary embodiments of the present invention may generate data signals and/or instructions having specified characteristics as required for use in a wide range of applications such as the formation of alphanumeric or special characters in a computing or communications environment or as an input data signal to and/or for control of a wide range of electronic, electro-mechanical or other devices. For example, exemplary embodiments may be configured to select phonemes by moving one or more domes in a specific direction. The association between dome movement and the phoneme selected may be a function of an end user's physical ability or limitations, for example. Alternate embodiments may be integral with an automobile's steering wheel, for example, to control various functions such as the radio functions, AC control, radio tuner, dialing a cell phone through the car system, etc. Various other embodiments may be used for industrial, aircraft or robotics control, controlling motorized wheelchairs, controlling functions in an automated house such as turning lights on and off, generating characters or icons for pictorial communication vs. alphanumeric, or a voice synthesized embodiment may be used for phoneme and icon reading in combination, for example. An LCD panel may be built into the housing of various embodiments of the present invention for a typing tutor, troubleshooting instructions, sound programming or other settings. Alternate embodiments may be used to control instant messaging functions or the buttons at the top of a Web browser, for example.

While the exemplary embodiments of the present invention have been shown and described by way of example only, numerous variations, changes and substitutions will occur to those of skill in the art without departing from the invention herein. Accordingly, it is intended that the invention be limited only by the spirit and scope of the appended claims.

What is claimed is:

1. An apparatus for generating a data signal, the apparatus comprising:
   a housing;
   a first controller moveably coupled to the housing;
   a plurality of impressions formed in a lower surface of the first controller with each individual impression of the plurality of impressions defining a distinct direction the first controller may be moved linearly or laterally from a center resting location;
   a first spring-loaded plunger;
   a ball bearing affixed to an upper end of the first spring-loaded plunger so that the ball bearing engages the plurality of impressions formed in the lower surface of the first controller for guiding the first controller along a linear or lateral direction from a center resting position;
   means for sensing linear or lateral movement of the first controller in the distinct direction as determined by one impression of the plurality of impressions and generating a signal indicative of a direction of movement of the first controller; and
   a processing module configured to generate the data signal in response to receipt of the signal indicative of a direction of movement of the first controller.

2. The apparatus of claim 1, the means for sensing linear or lateral movement of the first controller in the distinct direction as determined by one impression of the plurality of impressions and generating a signal indicative of a direction of movement of the first controller comprising a potentiometer having a pivotally extending joystick engaged with the first controller so that the joystick moves linearly or laterally from a center resting position in response to movement of the first controller.

3. The apparatus of claim 2 further comprising:
   a concave recess formed in the lower surface of the first controller; and
   a ball affixed to an upper end of the joystick so that the ball engages the concave recess.

4. The apparatus of claim 1 further comprising:
   a concave impression formed in the lower surface of the first controller; and
   a second spring-loaded plunger that engages the concave impression.

5. The apparatus of claim 1, further comprising:
   a second controller moveably coupled to the housing;
   a plurality of impressions formed in a lower surface of the second controller with each individual impressions of the plurality of impressions defining a distinct direction the second controller may be moved linearly or laterally from a center resting position;
   a second spring-loaded plunger;
   a ball bearing affixed to an upper end of the second spring-loaded plunger so that the ball bearing engages the plurality of impressions formed in the lower surface of the second controller for guiding the second controller along a linear or lateral direction from a center resting position;
   means for sensing linear or lateral movement of the second controller in the distinct direction as determined by one impression of the plurality of impressions and generating a signal indicative of a direction of movement of the second controller; and
   wherein the processing module is configured to generate the data signal in response to receipt of the signals indicative of a direction of movement of the first controller and the second controller.

6. The apparatus of claim 5, wherein the plurality of impressions is configured to provide for the second controller to be moved linearly and laterally from a center resting position in a single plane.

7. The apparatus of claim 1 wherein the impression comprises a variable depth kinematic impression.

8. The apparatus of claim 1, wherein the plurality of impression is in a shape of a flower such that each flower-pedal comprises an individual impression.

9. The apparatus of claim 1, wherein the plurality of impressions is configured to provide for the first controller to be moved linearly and laterally from a center resting position in a single plane.

10. An apparatus for generating a data signal, the apparatus comprising:
    a housing;
    a first controller moveably coupled to the housing;
    a concave surface positioned on an underside of the first controller;
    a plurality of impressions formed in the concave surface with each individual impression of the plurality of impressions defining a distinct direction the first controller may be moved linearly or laterally from a center resting position;
    a potentiometer for sensing movement of the first controller and generating a signal indicative of a direction of movement of the first controller, the potentiometer having a pivotally extending joystick with a guide nub affixed to an upper end of the joystick that engages the plurality of impressions;
    means for biasing the concave surface against the guide nub; and
    a processing module configured to generate the data signal in response to receipt of the signal indicative of a direction of movement of the first controller.

11. The apparatus of claim 10 further comprising:
    a plurality of extensions extending from the first controller;
    a base plate coupled with the first controller;
    an aperture formed in the base plate; and
    an insert within the aperture of the base plate wherein the concave surface is formed within the insert.

12. The apparatus of claim 11 the means for biasing the concave surface against the guide nub comprising a compression spring positioned between the first controller and the insert.

13. The apparatus of claim 10 further comprising:
a second controller moveably coupled to the housing;
a concave surface positioned on an underside of the second controller;
a plurality of impressions formed in the concave surface defining a distinct direction the second controller may be moved linearly or laterally from a center resting position;
a potentiometer for sensing movement of the second controller and generating a signal indicative of a direction of movement of the second controller, the potentiometer having a pivotally extending joystick with a guide nub affixed to an upper end of the joystick that engages the impression;
means for biasing the concave surface against the guide nub; and
wherein the processing module is configured to generate the data signal in response to receipt of the signals indicative of a direction of movement of the first controller and the second controller.

14. The apparatus of claim 13 wherein the processing module is configured to generate the data signal indicative of an alphanumeric character in response to receipt of at least one of the signal indicative of a direction of movement of the first controller and the signal indicative of a direction of movement of the second controller.

15. The apparatus of claim 13, wherein the plurality of impressions is configured to provide for the second controller to be moved linearly and laterally from a center resting position in a single plane.

16. The apparatus of claim 10, wherein the plurality of impressions is configured to provide for the first controller to be moved linearly and laterally from a center resting position in a single plane.

* * * * *